US012694720B2

(12) United States Patent (10) Patent No.: US 12,694,720 B2
Okamoto (45) Date of Patent: Jul. 28, 2026

(54) AUTHENTICATION APPARATUS, CONTROL METHOD, AND COMPUTER-READABLE MEDIUM

(71) Applicant: NEC Corporation, Tokyo (JP)

(72) Inventor: Yuuki Okamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 375 days.

(21) Appl. No.: 18/021,492

(22) PCT Filed: Sep. 28, 2020

(86) PCT No.: PCT/JP2020/036609
§ 371 (c)(1),
(2) Date: Feb. 15, 2023

(87) PCT Pub. No.: WO2022/064685
PCT Pub. Date: Mar. 31, 2022

(65) Prior Publication Data
US 2023/0326254 A1 Oct. 12, 2023

(51) Int. Cl.
*G06V 40/70* (2022.01)
*G06F 21/32* (2013.01)
(Continued)

(52) U.S. Cl.
CPC .............. *G06V 40/70* (2022.01); *G06F 21/32* (2013.01); *G06V 10/751* (2022.01);
(Continued)

(58) Field of Classification Search
CPC ...... G06F 21/32; G06V 10/751; G06V 10/82; G06V 20/653; G06V 40/171;
(Continued)

(56) References Cited

FOREIGN PATENT DOCUMENTS

CN 111444894 A 7/2020
EP 4193296 A1 6/2023
(Continued)

OTHER PUBLICATIONS

A machine translated English version of document JP2020107037 . (Year: 2020).*
(Continued)

*Primary Examiner* — Ruiping Li
(74) *Attorney, Agent, or Firm* — Sughrue Mion, PLLC

(57) ABSTRACT
An authentication apparatus (2000) acquires a target image (30) including a face area (32) of a target entity (20). The authentication apparatus (2000) computes, for one or more registered entities, an authentication score indicating a level of a probability that the target entity (20) matches the registered entity by using face information (50) of the registered entity and the face area (32). The authentication apparatus (2000) detects a symbol (42) from the target image (30) when there is no registered entity whose authentication score is greater than a first threshold. The symbol (42) is displayed on an attachment (40) worn on the face. When determining whether there is a registered entity matching the symbol (42) among the registered entities satisfying a predetermined condition based on the authentication score, the authentication apparatus (2000) determines that there is a registered entity that matches the target entity (20).

14 Claims, 14 Drawing Sheets

(51) Int. Cl.

| | | |
|---|---|---|
| *G06V 10/75* | (2022.01) | |
| *G06V 40/16* | (2022.01) | |
| *G06V 40/60* | (2022.01) | |

(52) U.S. Cl.
CPC .......... *G06V 40/171* (2022.01); *G06V 40/172* (2022.01); *G06V 40/67* (2022.01)

(58) Field of Classification Search
CPC ...... G06V 40/172; G06V 40/67; G06V 40/70; H04L 2463/082; H04L 63/0861
See application file for complete search history.

(56) References Cited

FOREIGN PATENT DOCUMENTS

| | | |
|---|---|---|
| JP | 2007-148872 A | 6/2007 |
| JP | 2014-157484 | 8/2014 |
| JP | 2019-008513 A | 1/2019 |
| JP | 2019-133314 | 8/2019 |
| JP | 2020107037 A * | 7/2020 ......... G06K 9/00228 |

OTHER PUBLICATIONS

A machine translated English version of document CN 111444894 (Year: 2020).*

Okumura, et al "Improving Face Recognition for Identity Verification by Managing Facial Directions and Eye Contact of Event Attendees", Jun. 2020. (Year: 2020).*

Baskaran, et al, "IoT Based COVID Preventive System for Work Environment", 2020. (Year: 2020).*

International Search Report for PCT Application No. PCT/JP2020/036609, mailed on Dec. 1, 2020.

Extended European Search Report for EP Application No. 20955279. 3, dated on Oct. 30, 2023.

Naser Damer et al., "The Effect of Wearing a Mask on Face Recognition Performance an Exploratory Study"; arxiv.org, Cornell University Library, 201 OLIN Library Cornell University Ithaca, NY 14853, Jul. 27, 2020, pp. 1-pp. 9.

* cited by examiner

AUTHENTICATION APPARATUS, CONTROL METHOD, AND COMPUTER-READABLE MEDIUM

This application is a National Stage Entry of PCT/JP2020/036609 filed on Sep. 28, 2020, the contents of all of which are incorporated herein by reference, in their entirety.

TECHNICAL FIELD

This disclosure relates to authentication using an image.

BACKGROUND ART

A technique for authenticating a person by photographing a face of an entity to be authenticated with a camera and performing matching between an obtained face image and a registered image has been developed. For example, PTL1 discloses a technique of, in a case where a person to be authenticated wears a mask or the like, removing the mask or the like from a face image obtained from a camera to generate a recall image, and perform matching between the recall image and a registered image to authenticate the person.

CITATION LIST

Patent Literature

PTL1: Japanese Unexamined Patent Application Publication No. 2007-148872

SUMMARY OF INVENTION

Technical Problem

This disclosure aims to improve the techniques disclosed in the aforementioned related art documents.

Solution to Problem

A first authentication apparatus of this disclosure includes an acquisition unit configured to acquire a target image including a face of a target entity and an authentication unit configured to authenticate the target entity. The authentication unit performs: determining, for one or more registered entities, whether the registered entity matches the target entity by using face information of the registered entity and face information of the target entity; and in a case where it is determined that there is no registered entity that matches the target entity, detecting a symbol representing identification information from the target image and determining whether there is the registered entity associated with the identification information represented by the symbol. The symbol is displayed on an attachment worn on a face.

A second authentication apparatus of this disclosure includes an acquisition unit configured to acquire a target image including a face of a target entity and an authentication unit configured to authenticate the target entity. The authentication unit performs: in a case where a symbol representing identification information is detected from the target image, computing, for one or more registered entities, an authentication score indicating a level of a probability that the target entity matches the registered entity by using face information of the registered entity and face information of the target entity, and in a case where there is a registered entity whose authentication score is greater than a first threshold, determining that there is the registered entity that matches the target entity; and in a case where the symbol is detected from the target image, computing the authentication score by using face information of a registered entity and face information of the target entity associated with identification information represented by the symbol, and determining that there is the registered entity that matches the target entity in a case where the authentication score is greater than a second threshold. The symbol is displayed on an attachment worn on a face, and the second threshold is smaller than the first threshold.

A third authentication apparatus of this disclosure includes an acquisition unit configured to acquire a target image including a face of a target entity and an authentication unit configured to authenticate the target entity. The authentication unit performs: detecting a face area of the target entity from the target image and detecting a symbol representing identification information from the face area; and in a case where there is a registered entity associated with the identification information represented by the symbol, determining that there is a registered entity that matches the target entity. The symbol is displayed on an attachment worn on a face.

A fourth authentication apparatus of this disclosure includes an acquisition unit configured to acquire a target image including a face area representing a face of a target entity; and an authentication unit configured to authenticate the target entity. The authentication unit performs: computing, for one or more registered entities belonging to a first group, an authentication score indicating a level of a probability that the target entity that matches the registered entity by using face information of the registered entity and face information of the target entity, and in a case where there is a registered entity whose authentication score is greater than a first threshold, determining that there is the registered entity that matches the target entity in the first group; and in a case where there is no registered entity that matches the target entity in the first group, detecting a symbol representing identification information from the target image and determining a second group corresponding to the identification information represented by the symbol as a group to which the target entity belongs. The symbol is displayed on an attachment worn on a face.

A control method of this disclosure is executed by a computer. The control method includes: an acquisition step of acquiring a target image including a face of a target entity; and an authentication step of authenticating the target entity. In the authentication step: for one or more registered entities, whether the registered entity matches the target entity is determined by using face information of the registered entity and face information of the target entity; in a case where it is determined that there is no registered entity that matches the target entity, a symbol representing identification information is detected from the target image and whether there is the registered entity associated with the identification information represented by the symbol is determined. The symbol is displayed on an attachment worn on a face.

A computer-readable medium of this disclosure causes a computer to execute an acquisition step of acquiring a target image including a face of a target entity and an authentication step of authenticating the target entity. In the authentication step: for one or more registered entities, whether the registered entity matches the target entity is determined by using the face information of the registered entity and the face information of the target entity; and in a case where it is determined that there is no registered entity that matches the target entity, a symbol representing identification information is detected from the target image and whether there is the registered entity associated with the identification information represented by the symbol is determined. The symbol is displayed on an attachment worn on a face.

EXAMPLE EMBODIMENT

Figure 1:
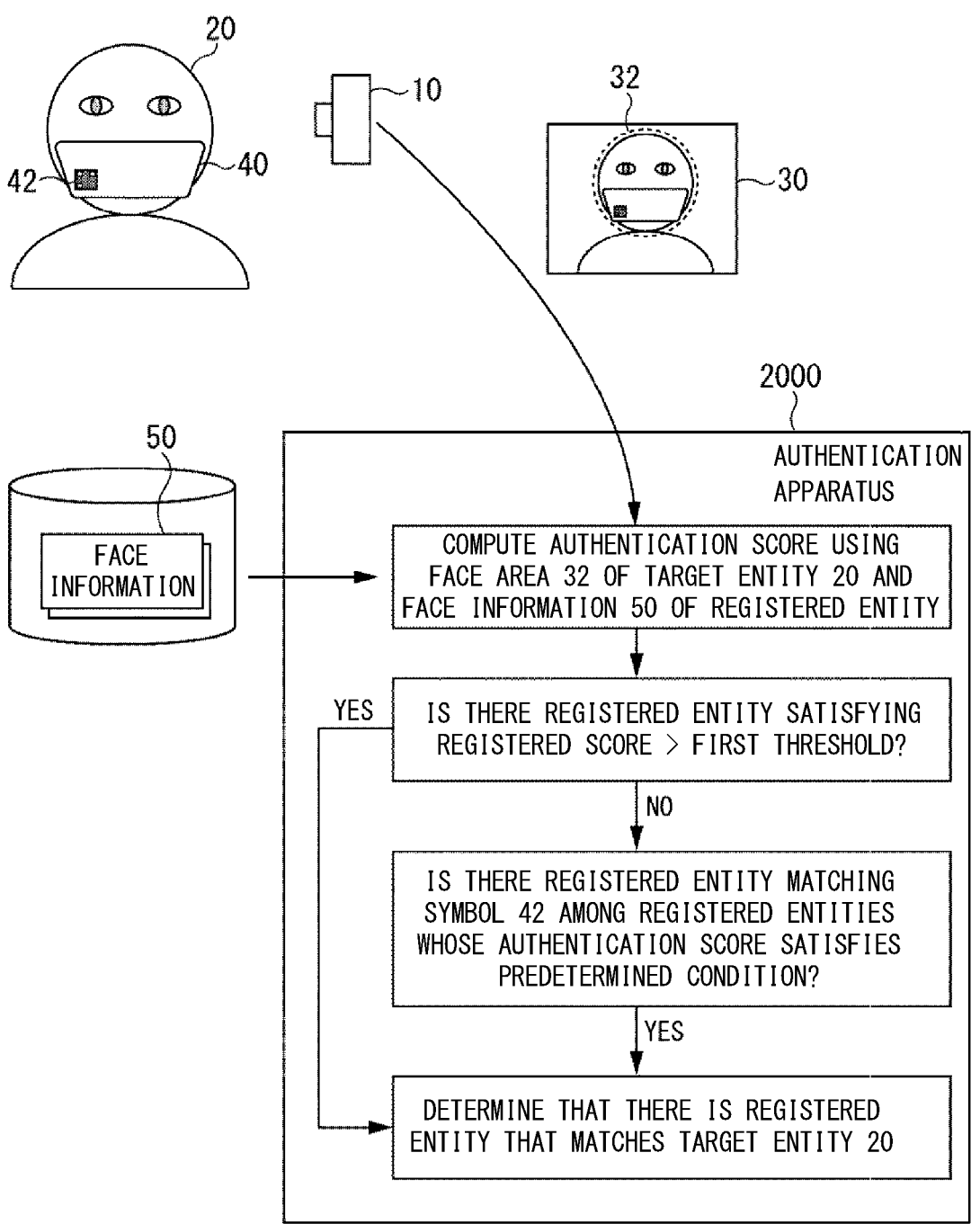
FIG. 1 is a diagram illustrating an overview of an operation of an authentication apparatus according to a first example embodiment.

Hereinafter, example embodiments of the present disclosure will be described in detail with reference to the drawings. In the drawings, the same or corresponding elements are denoted by the same reference numerals, and redundant description is omitted as necessary for clarity of description. In addition, various predetermined values (thresholds and the like) are stored in the storage device in advance unless otherwise specified.

First Example Embodiment

<Overview>
FIG. 1 is a diagram illustrating an overview of an operation of an authentication apparatus 2000 according to a first example embodiment. Here, FIG. 1 is a diagram for facilitating understanding of the overview of the authentication apparatus 2000, and the operation of the authentication apparatus 2000 is not limited to that illustrated in FIG. 1.

The authentication apparatus 2000 authenticates a target entity 20. The target entity 20 is an entity to be authenticated. The entity is arbitrary object, e.g., a person or other animal. In addition, an inanimate object such as a robot may be treated as an entity.

Here, the authentication means a determination of whether there is a person who is the same as the target person 20 in a plurality of registered entities that are registered in advance. For example, it is conceivable to perform authentication at an entrance of facility so that only entities registered in advance can enter the facility (admission management). In this case, the registered entity is an entity permitted to enter the facility. In a case where it is determined that there is a registered entity that matches the target entity 20, the target entity 20 may enter the facility. Meanwhile, in a case where it is determined that there is no registered entity that matches the target entity 20, the target entity 20 cannot enter the facility. As described later, the use scene of the authentication apparatus 2000 is not limited to the admission management.

Here, in an environment where the authentication apparatus 2000 is used, there is a possibility that the target entity 20 wears an attachment 40 on the face. The attachment 40 is an object that covers at least a part of the face of the target entity 20, such as a mask, a face guard, goggles, sunglasses, a hat, a sly, or the like. There is a possibility that a symbol 42 is attached to the attachment 40. The symbol 42 is a predetermined type of symbol that can represent identification information. For example, the symbol 42 is a mark representing encoded identification information, such as a bar code or a two-dimensional code. In another example, the symbol 42 is a sequence of characters, symbols, or the like (hereinafter, characters or the like) that can be recognized by a computer.

The authentication of the target entity 20 is performed as follows, for example. The authentication apparatus 2000 acquires a target image 30 generated by a camera 10. The authentication apparatus 2000 detects a face area 32 from the target image 30. An entity whose face is detected from the target image 30 is handled as the target entity 20. Further, the authentication apparatus 2000 acquires face information 50 for one or more registered entities. The face information 50 indicates information related to a facial feature of the registered entity in association with the identification information of the registered entity. For example, the face information 50 indicates an image feature value (a feature value obtained from an image) of the face of the registered entity.

The authentication apparatus 2000 computes, for each of one or more registered entities, an authentication score by using the face information 50 of the registered entity and the face area 32. The computed authentication score for the registered entity represents a likelihood that the target entity 20 is that registered entity. In a case where there is a registered entity with an authentication score greater than a predetermined first threshold, the authentication apparatus 2000 determines that there is a registered entity that is consistent with the target entity 20.

Here, in a case where the target entity 20 wears the attachment 40, a part of the face of the target entity 20 is hidden. Therefore, even when there is a registered entity that matches the target entity 20, there is a possibility that the authentication score computed for the registered entity is equal to or less than the first threshold.

Therefore, in a case where there is no registered entity having the authentication score greater than the first threshold, the authentication apparatus 2000 detects the symbol 42 from the target image 30 and authenticates the target entity 20 using the symbol 42. Specifically, the authentication apparatus 2000 determines whether there is a registered entity associated with the identification information represented by the symbol 42 detected from the target image 30, among the registered entities satisfying a predetermined condition (hereinafter, score condition) for the authentication score. Note that the registered entity that can be associated with the identification information represented by the symbol 42 may be only one registered entity or a plurality of registered entities. In the latter case, for example, identification information is allocated to a group to which a plurality of registered entities belong, and this identification information is represented by a symbol 42.

The score condition is set so as to be satisfied by a registered entity having a high probability of matching the target entity 20 to some extent. For example, the score condition is a condition that the "authentication score is maximum". Hereinafter, in order to simplify the notation, the "registered entity associated with the identification information represented by the symbol 42" is also referred to as a "registered entity matching the symbol 42".

In a case where there is a registered entity matching the symbol 42 among the registered entities satisfying the score condition, the authentication apparatus 2000 determines that there is a registered entity that matches the target entity 20. Meanwhile, in a case where there is no registered entity matching the symbol 42 among the registered entities satisfying the score condition, the authentication apparatus 2000 determines that there is no registered entity that matches the target entity 20.

<Example of Advantageous Effect>

According to the authentication apparatus 2000 of the present example embodiment, in a case where a registered entity matching the target entity 20 cannot be determined by comparing the facial feature of the target entity 20 obtained from the target image 30 with the facial features of the registered entities (in a case where the authentication score of each registered entity is equal to or less than the first threshold), the target entity 20 is authenticated by determining the presence of a registered entity matching the symbol 42 captured in the target image 30. Therefore, even in a case where it is difficult to accurately determine whether the target entity 20 matches the registered entity only with the facial feature of the target entity 20 obtained from the target image 30 since a part of the face of the target entity 20 is hidden by the attachment 40 such as a mask, it is possible to accurately determine whether the target entity 20 matches the registered entity by using the symbol 42.

In addition, in the system of PTL1, a face in a state where a mask or the like is not worn is not always accurately reproduced in the recall image. In this regard, in the authentication apparatus 2000 of the present example embodiment, unlike the system of PTL1, there is an advantage of not causing a problem that the original face of the entity may not be accurately reproduced when the recall image is generated by removing the mask or the like from the captured image of the face of the entity.

Here, the authentication apparatus 2000 determines whether there is a registered entity that matches the target entity 20 among the registered entities satisfying the score condition. As described above, the score condition is set so as to be satisfied by the registered entity having a high probability of matching the target entity 20 to some extent. Therefore, the registered entity that does not satisfy the score condition is considered to have a low probability of matching the target entity 20. Therefore, in the case of "although there is a registered entity matching the symbol 42, the registered entity does not satisfy the score condition", it is highly possible that the target entity 20 does not match the registered entity, and the attachment 40 of the registered entity is used by another entity. Therefore, when there is the registered entity matching the symbol 42 among the registered entities not satisfying the score condition, the authentication apparatus 2000 does not determine that there is the registered entity that matches the target entity 20. This can prevent impersonation in which attachments 40 of other entities is used.

Hereinafter, the authentication apparatus 2000 of the present example embodiment will be described in more detail.

<Example of Functional Configuration>

Figure 2:
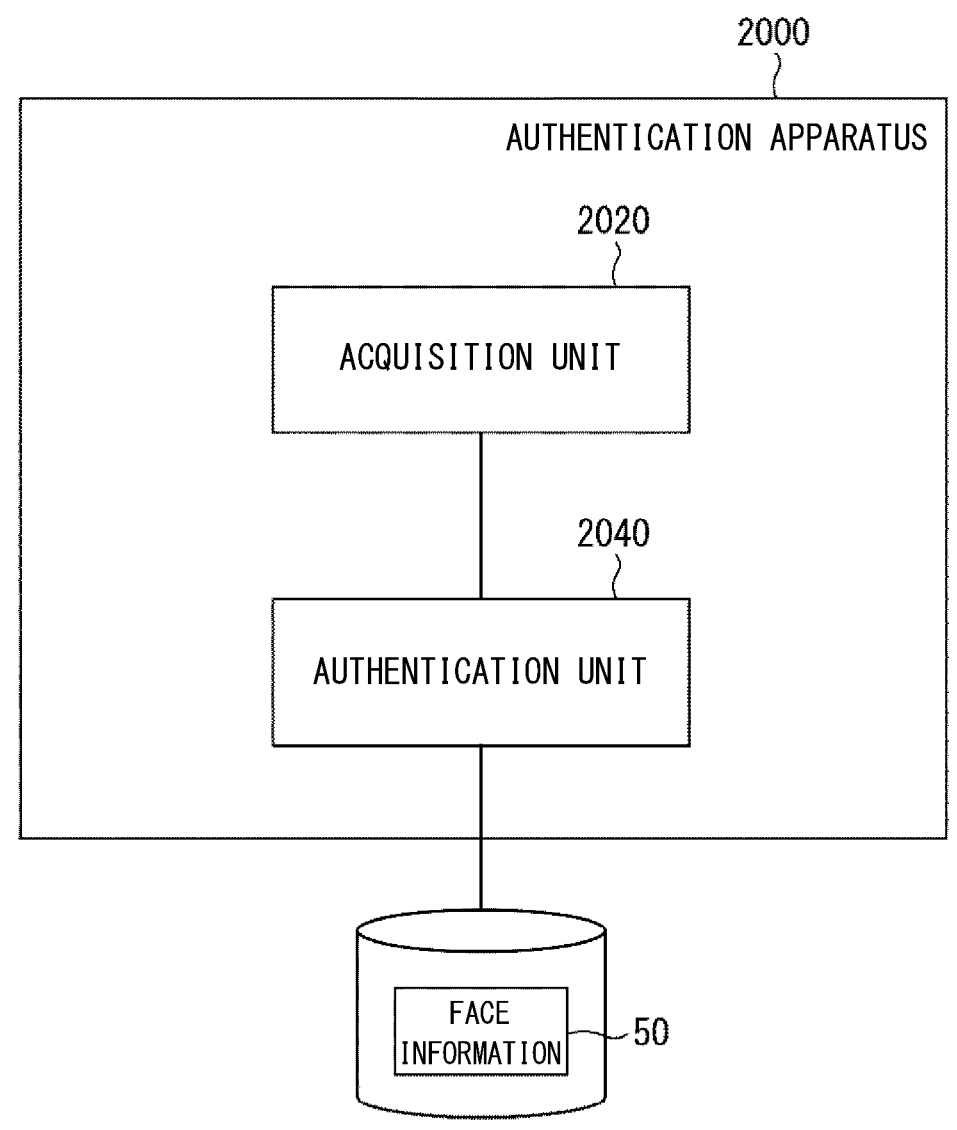
FIG. 2 is a block diagram illustrating a functional configuration of an authentication apparatus of the first example embodiment.

FIG. 2 is a block diagram illustrating a functional configuration of the authentication apparatus 2000 of the first example embodiment. The authentication apparatus 2000 includes an acquisition unit 2020 and an authentication unit 2040. The acquisition unit 2020 acquires the target image 30 including the face area 32 of the target entity 20. The authentication unit 2040 determines whether there is a registered entity that matches the target entity 20. Specifically, the authentication unit 2040 computes, for one or more registered entities, an authentication score by using the face area 32 and the face information 50 of the registered entity. In a case where there is no registered entity having an authentication score greater than the first threshold, the authentication unit 2040 detects the symbol 42 from the target image 30. Then, the authentication unit 2040 determines whether there is a registered entity matching the symbol 42 among the registered entities whose authentication scores satisfy a predetermined condition (score condition). In a case where there is a registered entity matching the symbol 42 among the registered entities satisfying the score condition, the authentication unit 2040 determines that there is a registered entity that matches the target entity 20.

<Example of Hardware Configuration>

Each functional configuration unit of the authentication apparatus 2000 may be realized by hardware (for example, a hard-wired electronic circuit or the like) that realizes each functional configuration unit, or may be realized by a combination of hardware and software (for example, a combination of an electronic circuit and a program that controls the electronic circuit or the like). Hereinafter, a case where each functional configuration unit of the authentication apparatus 2000 is realized by a combination of hardware and software will be further described.

Figure 3:
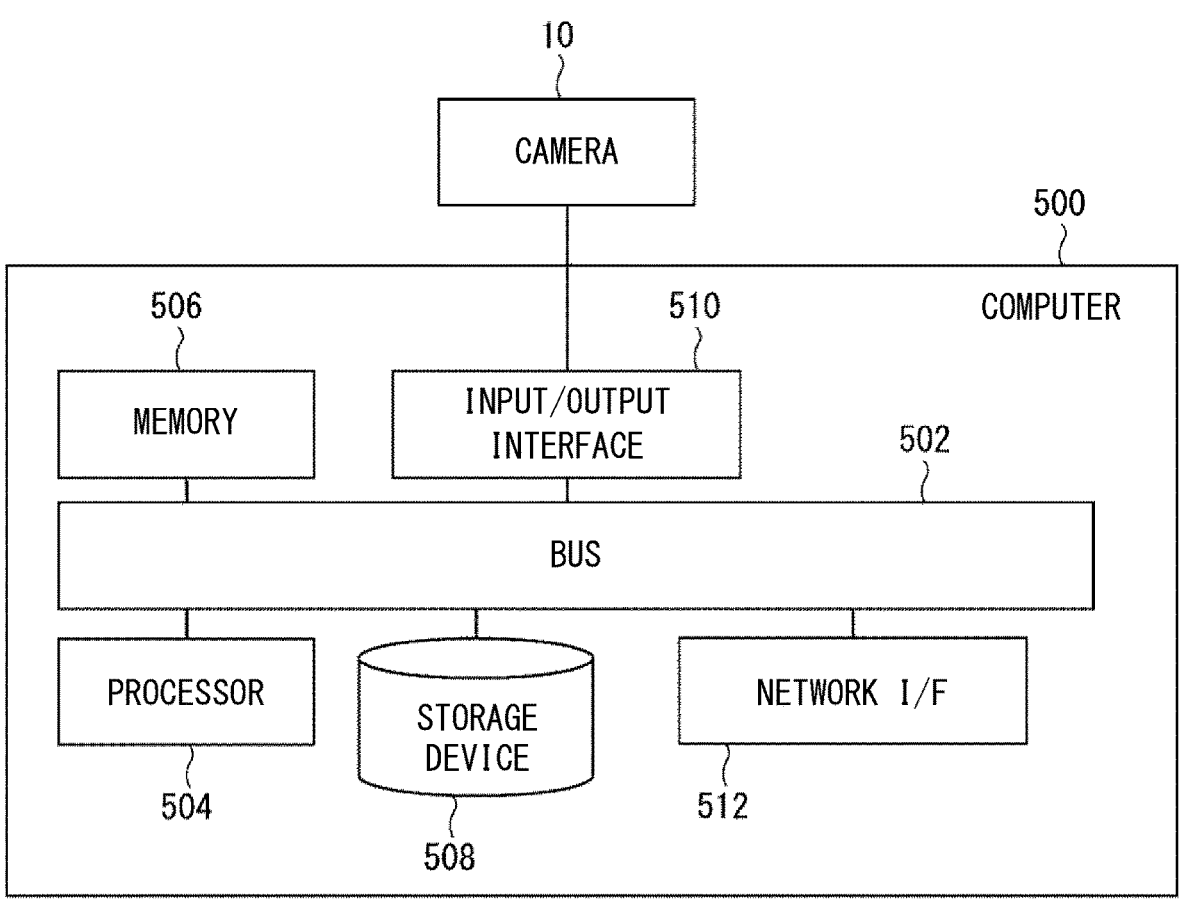
FIG. 3 is a block diagram illustrating a hardware configuration of a computer that implements the authentication apparatus of the first example embodiment.

FIG. 3 is a block diagram illustrating a hardware configuration of a computer 500 that implements the authentication apparatus 2000. The computer 500 is any computer. For example, the computer 500 is a stationary computer such as a personal computer (PC) or a server machine. In another example, the computer 500 is a portable computer such as a smartphone or a tablet terminal. In another example, the computer 500 may be the camera 10.

The computer 500 may be a special-purpose computer designed to realize the authentication apparatus 2000, or may be a general-purpose computer. For example, by installing a predetermined application in the computer 500, each function of the authentication apparatus 2000 is realized in the computer 500. The application is configured by a program for realizing a functional configuration unit of the authentication apparatus 2000.

The computer 500 includes a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, the method of connecting the processor 504 and the like to each other is not limited to the bus connection.

The processor 504 is various processors such as a central processing unit (CPU), a graphics processing unit (GPU), a field-programmable gate array (FPGA), a digital signal processor (DSP), or an application specific integrated circuit (ASIC). The memory 506 is a main storage device realized by using a random access memory (RAM) or the like. The storage device 508 is an auxiliary storage device realized by using a hard disk, a solid state drive (SSD), a memory card, a read only memory (ROM), or the like.

The input/output interface 510 is an interface for connecting the computer 500 and an input/output device. For example, the camera 10 is connected to the input/output interface 510. However, the camera 10 may be connected to the computer 500 via the network interface 512 instead of the input/output interface 510. Furthermore, the camera 10 may not be connected to the computer 500.

The network interface 512 is an interface for connecting the computer 500 to a network. The network may be a local area network (LAN) or a wide area network (WAN).

The storage device 508 stores a program (program for realizing the above-described application) for realizing each functional configuration unit of the authentication apparatus 2000. The processor 504 implements each functional configuration unit of the authentication apparatus 2000 by reading and executing this program in the memory 506.

The authentication apparatus 2000 may be realized by one computer 500 or may be realized by a plurality of computers 500. In the latter case, the configurations of the computers 500 do not need to be the same, and can be different from each other.

<Flow of Processing>

Figure 4:
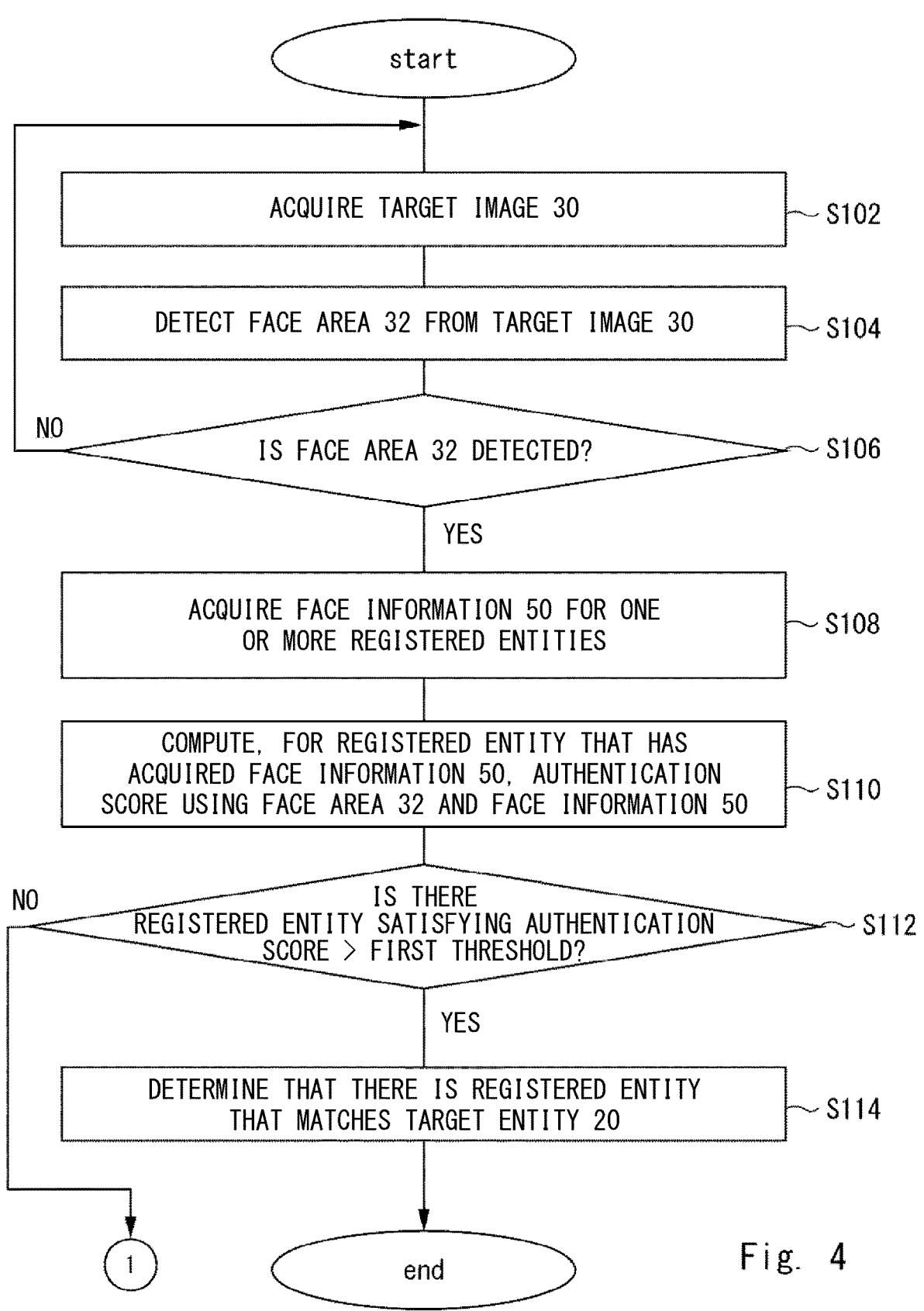
FIG. 4 is a first flowchart illustrating a flow of processing executed by the authentication apparatus of the first example embodiment.
Figure 5:
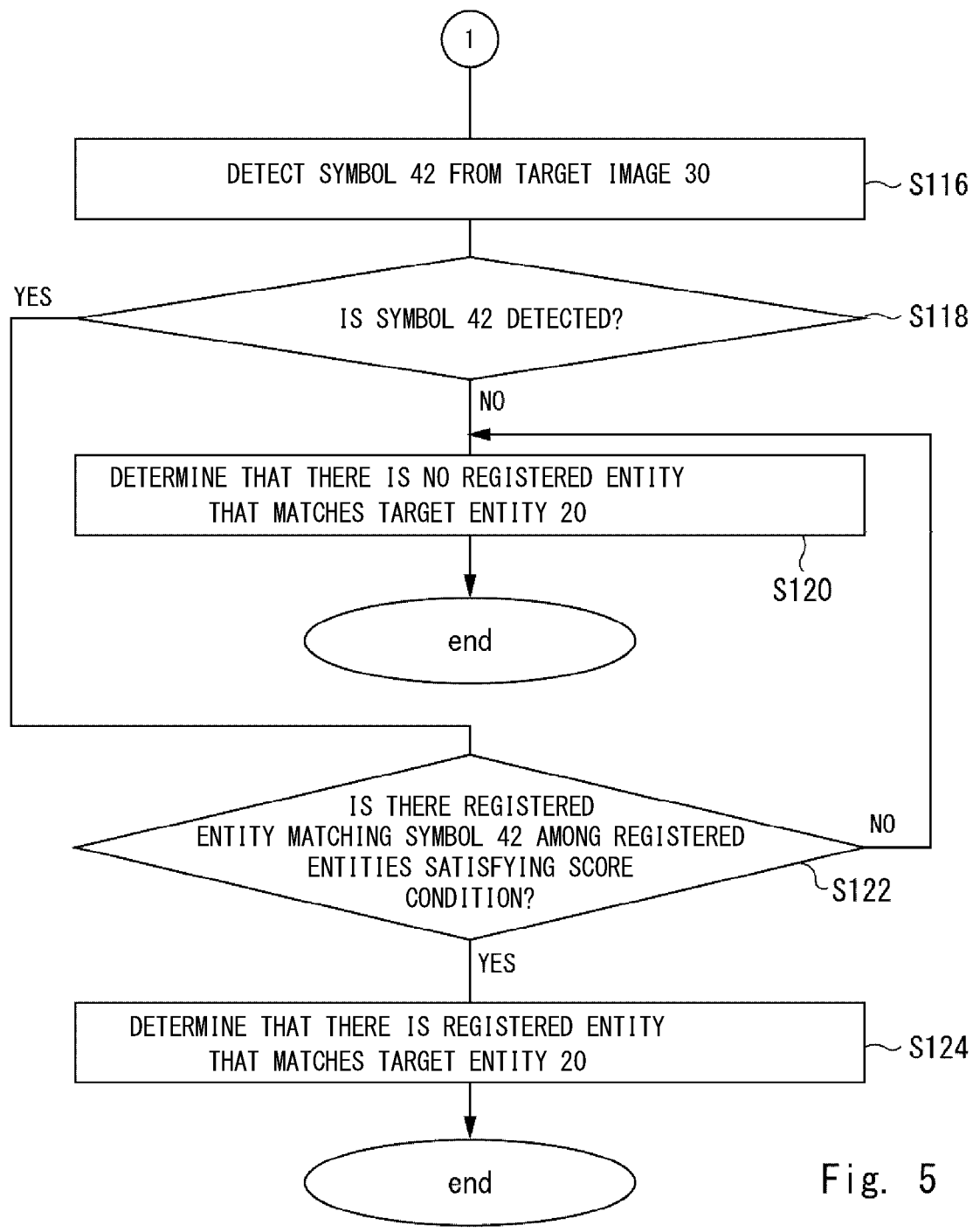
FIG. 5 is a second flowchart illustrating the flow of the processing executed by the authentication apparatus of the first example embodiment.

FIGS. 4 and 5 are flowcharts illustrating a flow of processing executed by the authentication apparatus 2000 of the first example embodiment. The acquisition unit 2020 acquires the target image 30 (S102). The authentication unit 2040 detects the face area 32 from the target image 30 (S104). In a case where the face area 32 is not detected from the target image 30 (S106: NO), the processing of FIG. 4 returns to S102. That is, the processing in and after S108 is performed only for the captured image including the face area 32 among the captured images generated by the camera 10.

In a case where the face area 32 is detected from the target image 30 (S106: YES), the authentication unit 2040 acquires the face information 50 for each of the one or more registered entities (S108). The authentication unit 2040 computes, for each registered entity for which the face information 50 has been acquired, an authentication score by using the face area 32 and the face information 50 (S110). The authentication unit 2040 determines whether there is a registered entity whose authentication score is greater than the first threshold (S112). In a case where there is a registered entity whose authentication score is greater than the first threshold (S112: YES), the authentication unit 2040 determines that there is a registered entity that matches the target entity 20 (S114).

S116 to S120 are illustrated in FIG. 5. In a case where there is no registered entity whose authentication score is greater than the first threshold (S112: NO), the authentication unit 2040 detects the symbol 42 from the target image 30 (S116). In a case where the symbol 42 is not detected from the target image 30 (S118: NO), the authentication unit 2040 determines that there is no registered entity that matches the target entity 20 (S120).

In a case where the symbol 42 is detected from the target image 30 (S118: YES), the authentication unit 2040 determines whether there is a registered entity matching the symbol 42 among the registered entities satisfying the score condition (S122). In a case where there is a registered entity matching the symbol 42 among the registered entities satisfying the score condition (S122: YES), the authentication unit 2040 determines that there is a registered entity that matches the target entity 20 (S124). Meanwhile, in a case where there is no registered entity matching the symbol 42 among the registered entities satisfying the score condition (S122: NO), the authentication unit 2040 determines that there is no registered entity that matches the target entity 20 (S120).

<Acquisition of Target Image 30: S102>

The acquisition unit 2020 acquires the target image 30. Here, various methods can be used as a method of acquiring the image generated by the camera. For example, the acquisition unit 2020 acquires the target image 30 by accessing a storage device in which the target image 30 is stored. Here, the storage device may be provided either inside or outside the camera 10. In another example, the acquisition unit 2020 may acquire the target image 30 by receiving the target image 30 transmitted from the camera 10 to the authentication apparatus 2000.

Here, the acquisition unit 2020 acquires a plurality of target images 30 repeatedly generated by the camera 10. The acquisition unit 2020 may acquire the target image 30 each time the new target image 30 is newly generated by the camera 10, or may collectively acquire a plurality of target images 30 that have not yet been acquired. In the latter case, for example, the acquisition unit 2020 collectively acquires the target images 30 that have not been acquired yet at predetermined time intervals.

Note that the acquisition unit 2020 may acquire all the target images 30 generated by the camera 10 or may acquire only some of the target images 30. In the latter case, for example, the acquisition unit 2020 acquires one target image 30 generated by the camera 10 every predetermined number.

<Attachment 40>

As described above, the symbol 42 may be displayed on the attachment 40. A method for displaying the symbol 42 on the attachment 40 is arbitrary. For example, the symbol 42 is directly printed, drawn, or engraved on the attachment 40. In another example, the symbol 42 may be printed, drawn, or engraved on a medium such as a seal. In this case, the medium on which symbol 42 is displayed is attached (for example, glued) to attachment 40, whereby the symbol 42 is displayed on the attachment 40.

The entity using the attachment 40 may acquire the attachment 40 in which the symbol 42 is already displayed, or may attach the symbol 42 to the attachment 40 in which the symbol 42 is not displayed by itself. In the former case, for example, the attachment 40 that displays the symbol 42 matching the registered entity is distributed from the company or the like that provides the service or the like to the registered entity that has registered for the use of the service or the like in advance.

Meanwhile, in a case where a user of the attachment 40 attaches the symbol 42 to the attachment 40 by herself/ himself, an arbitrary mask or the like can be used as the attachment 40. In this case, for example, a medium such as a seal on which the symbol 42 matching the registered entity is displayed is distributed from a company or the like that provides the service or the like to the registered entity that has registered for the use of the service or the like in advance. The registered entity attaches the distributed medium to the attachments 40 obtained by itself. In addition, instead of distributing a medium on which the symbol 42 is already displayed, an image of the symbol 42 may be distributed to the registered entity. In this case, the registered entity prints and utilizes this image on a seal or the like.

Furthermore, as will be described later, in a case where a handwritten signature or the like is used as the symbol 42, use registration may be performed using an image such as a handwritten signature or the like. That is, an entity that desires to use a service or the like prepares an image such as a handwritten signature, and performs use registration using the image. After completion of the use registration, for example, the attachment 40 on which the image is printed is distributed to the entity. However, as described above, the entity may perform the processing of attaching the symbol 42 to the attachment 40 by itself.

<Detection of Face Area 32: S104>

The acquisition unit 2020 detects the face area 32 from the target image 30 (step S104). The face area 32 is an image area representing the face of the entity. An existing technique can be used as a technique for detecting an image area representing a person's face from an image.

Here, in a case where the camera 10 captures a wide range to some extent, faces of a plurality of entities may be included in an imaging range of the camera 10. Therefore, a plurality of face areas 32 can be detected from the target image 30. In a case where the plurality of face areas 32 is detected from the target image 30 in this manner, the authentication apparatus 2000 may perform the authentication on all of the plurality of face areas 32 or may perform the authentication on some of them. In the former case, the processing in and after S108 is performed for each of all the detected face areas 32. Meanwhile, in the latter case, the processing in and after S108 is performed only for some face areas 32.

In a case where the authentication is performed only for some face areas 32, for example, the authentication apparatus 2000 determines the face area 32 to be the authentication target based on a distance from the face area 32 to the center of the target image 30, a size of the face area 32, and the like. For example, among the plurality of face areas 32 detected from the target image 30, the authentication apparatus 2000 handles only the face area 32 having the minimum distance from the center of the target image 30 or the face area 32 having the distance from the center of the target image 30 equal to or less than the threshold as the authentication target. In another example, the authentication apparatus 2000 handles only the face area 32 having the maximum size or the face area 32 having the size equal to or greater than the threshold as the authentication target among the plurality of face areas 32 detected from the target image 30.

<Acquisition of Face Information 50: S108>

The authentication unit 2040 acquires the face information 50 for one or more registered entities (S108). The face information 50 includes information indicating the facial features of the registered entity. For example, the face information 50 includes an image of the face of the registered entity. In another example, the face information 50 indicates an image feature value extracted from the image of the face of the registered entity. The face information 50 is stored in advance in a storage device accessible from the authentication unit 2040.

<Calculation of Authentication Score: S110>

The authentication unit 2040 computes the authentication score by using the face area 32 and the face information 50 (S110). For example, the authentication unit 2040 extracts the image feature value from the face area 32, and computes the authentication score by using the image feature value and the image feature value of the face of the registered entity. Note that, in a case where the face information 50 indicates the image of the face of the registered entity, the authentication unit 2040 obtains the image feature value of the face of the registered entity by extracting the feature value from the image.

Here, an existing technique can be used as a technique of computing a level of a probability (that is, the authentication score) that the two faces represent the faces of the same entity by comparing the image feature values of the two faces. For example, it is conceivable to use a reciprocal of the distance between the image feature values as the authentication score. As the distance between the image feature values, an arbitrary distance such as a cosine distance or a Euclidean distance can be used. In another example, a trained model that is trained to output an authentication score in response to input of two image feature values is prepared in advance. For example, a neural network or the like can be used as the trained model. In this case, the authentication unit 2040 can obtain the authentication score by inputting the image feature value obtained from the face area 32 and the image feature value obtained from the face information 50 to the trained model.

The authentication score is computed for one or more registered entities. For example, the authentication unit 2040 sequentially performs, for each registered entity, a set of processing of 1) acquisition of the face information 50, 2) calculation of the authentication score, and 3) comparison between the authentication score and the first threshold. That is, the authentication unit 2040 performs the series of processes described above for a registered entity, and in a case where the authentication score is equal to or less than the first threshold, the series of processes described above is similarly performed for the next registered entity. For example, this flow is repeated until the authentication score greater than the first threshold is computed or all the authentication scores of the registered entities are determined to be equal to or less than the first threshold.

<<Use of Three-Dimensional Data>>

Here, three-dimensional data of the face may be further used to compute the authentication score. In this case, the acquisition unit 2020 further acquires three-dimensional data (data representing a group of coordinates in a three-dimensional space) of the face of the target entity 20 in addition to the target image 30. The face information 50 further includes three-dimensional data of the face of the registered entity. The authentication unit 2040 computes the authentication score by using the face information 50 including the face area 32, the three-dimensional data of the face of the target entity 20, and the three-dimensional data of the face of the registered entity. By computing the authentication score using the three-dimensional data in this manner, it is possible to more accurately compute the level of the probability that the target entity 20 matches the registered entity.

As a method of computing the authentication score by further using the three-dimensional data, various methods can be employed. For example, it is conceivable to prepare a trained model that is trained in advance so as to output the authentication score in response to the input of the image feature value of the face area 32 of the target entity 20, the three-dimensional data of the face of the target entity 20, the image feature value of the face of the registered entity, and the three-dimensional data of the face of the registered entity. In this case, the authentication unit 2040 can obtain the authentication score by inputting the image feature value of the face area 32, the three-dimensional data of the face of the target entity 20, the image feature value of the face of the registered entity obtained from the face information 50, and the three-dimensional data of the face of the registered entity obtained from the face information 50 to the trained model.

This trained model can be trained using, for example, training data that includes a combination of "an image feature value of the face of the first entity, a three-dimensional data of the face of the first entity, an image feature value of the face of the second entity, a three-dimensional data of the face of the second entity, a ground-truth authentication score". For example, 1) the maximum possible value of the authentication score is set to the ground-truth authentication score in a case where the first entity and the second entity are the same entity as each other, and 2) the minimum possible value of the authentication score is set to the ground-truth authentication score in a case where the first entity and the second entity are different entities from each other.

Here, there are various methods of acquiring the three-dimensional data of the face of the entity. For example, by using a stereo camera or a depth camera as the camera 10, three-dimensional data of the face of the target entity 20 can be obtained from the camera 10. In another example, various distance sensors may be provided separately from the camera 10, and three-dimensional data of the face of the target entity 20 may be obtained using a result of distance measurement obtained from the distance sensor.

<Detection of Symbol 42: S116>

The authentication unit 2040 detects the symbol 42 from the target image 30 (S116). As described above, the symbol 42 is a predetermined type of symbol including various marks, characters, and the like that can express the identification information.

As the symbol 42, various types of symbols can be employed. For example, the symbol 42 is a code such as a barcode or a two-dimensional code. In this case, data obtained by decoding the code is the identification information represented by the symbol 42. In another example, the symbol 42 is a string of characters or the like recognizable by a computer (characters or the like to which character codes are assigned). In this case, data obtained by recognizing the symbol 42 by character recognition processing such as optical character recognition (OCR) is identification information represented by the symbol 42. In another example, a feature of the appearance (a shape, a pattern, or the like of the symbol 42) of the symbol 42 itself may represent the identification information. Examples of the case where the symbol 42 itself represents the identification information include a case where a unique image is used for each registered entity, and a case where a handwritten signature, a drawing, or the like is used.

An existing technique can be used as a technique for detecting a predetermined type of symbol representing identification information from an image. For example, image feature values representing features common to symbols are stored in a storage device accessible from the authentication unit 2040. For example, in a case where a two-dimensional code is used as the symbol 42, the image feature value common to the two-dimensional code is stored in the storage device. The authentication unit 2040 detects the symbol 42 by detecting the image area having the image feature value from the target image 30. In another example, a trained model that is trained in advance to detect a predetermined type of symbol from an input image may be prepared. For such a trained model, a neural network or the like can be used. In this case, the authentication unit 2040 detects the symbol 42 by inputting the target image 30 to the trained model.

Here, the authentication unit 2040 may perform a search for detecting the symbol 42 on the entire target image 30 or only on a part of the target image 30. In the latter case, for example, the authentication unit 2040 detects the symbol 42 from the inside of the face area 32. In another example, a predetermined area (for example, in the case of a mask, an area around the mouth) to which the attachment 40 can be worn may be determined in advance, and the search may be performed only on the predetermined area. In another example, the authentication unit 2040 may detect an area representing the attachment 40, and detect the symbol 42 from the inside of the area. By limiting the range of the search in this manner, the symbol 42 can be detected at high speed. In addition, it is possible to avoid erroneously detecting a displayed symbol other than the attachment 40 as the symbol 42. For example, in a case where a two-dimensional code is used as the symbol 42, it is possible to avoid detecting a two-dimensional code displayed on a display of a smartphone or the like as the symbol 42.

Note that, in a case where a plurality of face areas 32 is obtained from the target image 30, it is necessary to associate the face area 32 with the symbol 42. In this case, for example, the authentication unit 2040 associates the symbol 42 detected from the target image 30 with the closest face area 32 or the face area 32 having the symbol 42 therein.

<Determination Using Symbol 42: S118>

The authentication unit 2040 uses the symbol 42 to determine whether there is a registered entity that matches the target entity 20 among the registered entities that satisfy the score condition. Specifically, the authentication unit 2040 determines whether there is a registered entity matching the symbol 42 among the registered entities satisfying the score condition (S118).

The registered entity satisfying the score condition is a registered entity whose authentication score is equal to or less than the first threshold and whose probability of matching the target entity 20 is considered to be high to some extent. It can also be said that "a candidate for the registered entity that matches the target entity 20". For example, the score condition is a condition of "being equal to or higher than a predetermined rank in descending order of authentication scores". Note that, in a case where the predetermined rank is 1, only the registered entity having the maximum authentication score is handled as a candidate for the registered entity that matches with the target entity 20. In another example, the score condition is a condition that "the authentication score is equal to or greater than a second threshold (second threshold<first threshold)". In addition, a combination of the above two score conditions, that is, a score condition of "a predetermined rank or higher in descending order of authentication scores, and an authentication score is equal to or greater than a second threshold" may be used. By using these conditions, it is possible to appropriately narrow down the registered entities to be targets of matching of the identification information.

The authentication unit 2040 acquires identification information for each registered entity satisfying the score condition. For example, this identification information is stored in the storage device together with the face information 50 described above. The authentication unit 2040 performs matching between the identification information of the registered entity and the symbol 42.

In a case where a plurality of types of identification information is associated with the registered entity, which type of identification information is used for matching is determined in advance. For example, suppose that two types of identification information including an employee number of the registered entity and an identification number assigned to the attachment 40 used by the registered entity are associated with the registered entity. Suppose that the identification number given to attachment 40 is used for matching with symbol 42. In this case, the authentication unit 2040 acquires the identification number given to the attachment 40 among the plurality of pieces of identification information associated with the registered entity, and performs matching between the identification number and the symbol 42.

There are various methods for performing matching between the symbol 42 and the identification information of the registered entity. For example, in a case where the symbol 42 represents a code such as a two-dimensional code, the authentication unit 2040 obtains the identification information by decoding the code. Then, the authentication unit 2040 determines whether the identification information obtained by decoding the symbol 42 matches the identification information of the registered entity satisfying the score condition. In a case where the identification information obtained by decoding the symbol 42 matches the identification information of a registered entity, the authentication unit 2040 determines that there is the registered entity that matches the target entity 20. In addition, the registered entity is determined as a registered entity that matches the target entity 20.

In another example, suppose that the symbol 42 represents a string of characters or the like to which character codes are assigned. In this case, for example, the authentication unit 2040 performs character recognition processing on the symbol 42 to determine a string of characters of the like represented by the symbol 42. Then, the authentication unit 2040 determines whether the string of characters or the like determined in this way matches with the identification information of the registered entity satisfying the score condition. In case where a string of characters or the like determined by performing the character recognition processing on the symbol 42 matches the identification information (string of characters or the like) of a registered entity, the authentication unit 2040 determines that there is the registered entity that matches the target entity 20. In addition, the registered entity is determined as a registered entity that matches the target entity 20.

In another example, suppose that the feature of the appearance of the symbol 42 itself represents the identification information. In this case, the image of the symbol and the image feature value extracted from the image are associated with the registered entity as the identification information. In a case where the symbol 42 itself is used as the identification information in this manner, the authentication unit 2040 performs matching between the symbol 42 on the target image 30 and the symbol associated with the registered entity. More specifically, for example, the authentication unit 2040 compares the image feature value extracted from the symbol 42 on the target image 30 with the image feature value extracted from the image of the symbol associated with the registered entity satisfying the score condition, and determines whether the image feature values match each other (for example, similarities of these image feature values are equal to or greater than a threshold.). In a case where the image feature value extracted from the symbol 42 matches the image feature value of the symbol associated with a certain registered entity, the authentication unit 2040 determines that there is a registered entity that matches the target entity 20. In addition, the registered entity is identified as a registered entity that matches the target entity 20.

Here, it is also possible that the target entity 20 wears a plurality of attachments 40. For example, there is a case where the target entity 20 is wearing a mask and sunglasses, and the symbol 42 is displayed on each of them. Various methods can be adopted as a method of handling such a case.

For example, the authentication unit 2040 compares the plurality of symbols 42 to determine whether all the plurality of symbols 42 represent the same identification information as each other. In a case where these pieces of information represent the same identification information as each other, the authentication unit 2040 determines whether there is a registered entity associated with the identification information that matches the identification information among the registered entities satisfying the score condition. Meanwhile, in a case where there is a symbol representing identification information different from the other symbols 42 among the plurality of symbols 42, the authentication unit 2040 handles this situation as an error and terminates the authentication processing. In this case, for example, the authentication unit 2040 may output a message indicating that there is a possibility that a mask or the like of another entity is worn, such as "a mask or the like of another person is worn" or "wear your own mask or the like". The message is displayed on a display device browsable by the target entity 20, for example, similarly to various messages described later.

In another example, the authentication unit 2040 may perform matching between each of the plurality of symbols 42 and the identification information of the registered entity. In this case, for example, in a case where at least one of the plurality of symbols 42 matches a registered entity that satisfies the score condition, the authentication unit 2040 determines that there is a registered entity that matches the target entity 20.

Note that the identification information of the registered entity matching the symbol 42 does not necessarily match the identification information represented by the symbol 42. For example, information indicating association between the identification information represented by the symbol 42 and the identification information of the registered entity is stored in advance in a storage device accessible from the authentication unit 2040. Hereinafter, this information is referred to as association information. In this case, the authentication unit 2040 determines whether the identification information represented by the symbol 42 and the identification information of any registered entity satisfying the score condition are associated with each other in the association information. In a case where the identification information of any registered entities satisfying the score condition is associated with the identification information represented by the symbol 42 by the association information, the authentication unit 2040 determines that there is a registered entity matching the symbol 42 among the registered entities satisfying the score condition. Meanwhile in a case where the identification information of neither one of the registered entities satisfying the score condition is associated with the identification information represented by the symbol 42 by the association information, the authentication unit 2040 determines that there is no registered entity matching the symbol 42 among the registered entities satisfying the score condition.

Note that, as described above, a plurality of registered entities may be associated with the identification information represented by the symbol 42. In this case, in the association information, identification information of a plurality of registered entities is associated with identification information of one symbol 42.

<Processing According to Determination Result: S114, S120, and S124>

Through the various processes described above, it is determined whether there is a registered entity that matches the target entity 20 (S114, S120, S124). There are various types of processing performed according to the result of such authentication. Hereinafter, processing performed according to a result of authentication will be specifically exemplified.

For example, the result of authentication by the authentication apparatus 2000 is used to restrict the use of an object or a service, entities that can use it being restricted. For example, suppose that authentication using the authentication apparatus 2000 is performed at an entrance of a facility where only a registered entity is permitted to enter. In this case, when it is determined that there is a registered entity that matches the target entity 20, the target entity 20 is permitted to enter the facility. Meanwhile, when it is determined that there is no registered entity that matches the target entity 20, the target entity 20 is not permitted to enter the facility.

Suppose that a gate whose opening and closing are controlled according to a result of authentication by the authentication apparatus 2000 is provided. In this case, the gate is opened by a control apparatus that controls the gate in response to the determination that the registered entity matches the target entity 20 is present. Meanwhile, in a case where it is determined that there is no registered entity that matches the target entity 20, the gate is closed by the control apparatus.

Here, the authentication apparatus 2000 may be implemented as a part of the control apparatus that controls opening and closing of a gate, or may be implemented separately from the control apparatus. In the latter case, the authentication apparatus 2000 transmits a notification indicating the authentication result of the target entity 20 to the control apparatus. The control apparatus opens or closes the gate according to the content of the notification. Note that, in a case where the authentication apparatus 2000 is implemented separately from the control apparatus, the computer that implements the control apparatus has the hardware configuration illustrated in FIG. 3, for example, similarly to the authentication apparatus 2000.

A place where the gate is controlled using the authentication by the authentication apparatus 2000 is not limited to the entrance of the facility. For example, the gate may be provided at an exit of the facility or at boundaries among a plurality of areas in the facility.

In another example, the authentication apparatus 2000 may be used for authentication for using a user terminal. The user terminal is configured to be available only to the registered entity. In this case, when it is determined that there is a registered entity that matches the target entity 20, the target entity 20 can use the user terminal. For example, the user terminal executes login processing with the guest account. Meanwhile, in a case where it is determined that there is no registered entity that matches the target entity 20, the target entity 20 cannot use the user terminal. For example, the user terminal performs processing of a login failure.

The authentication apparatus 2000 may be implemented integrally with the user terminal, or may be implemented separately from the user terminal. In the latter case, the authentication apparatus 2000 transmits a notification indicating the authentication result of the target entity 20 to the user terminal. The user terminal performs the login processing according to the content of the notification. Note that, in a case where the authentication apparatus 2000 is implemented separately from the user terminal, the user terminal has the hardware configuration illustrated in FIG. 3, for example, similarly to the authentication apparatus 2000.

Note that, in the above-described example, entities permitted to use objects or services are registered in advance. However, conversely, an entity that is not permitted to use an object or a service may be registered in advance. For example, the control apparatus of the gate described above closes the gate when it is determined that there is a registered entity that matches the target entity 20, and opens the gate when it is determined that there is no registered entity that matches the target entity 20. In this way, it is possible to avoid providing specific objects or services to entities on a so-called watch list, and to provide the specific objects or services to other people.

The processing according to the authentication result by the authentication apparatus 2000 may be processing that is performed based on not only whether there is a registered entity that matches the target entity 20 but also which registered entity matches the target entity 20. Suppose that a facility that can be used by the registered entity is determined in advance for each registered entity. In this case, the authentication apparatus 2000, which performs authentication for use of a certain facility, determines a registered entity that matches the target entity 20, and then determines whether the registered entity is an entity permitted to use the facility. When the registered entity is an entity permitted to use the facility, the control apparatus opens the gate. Meanwhile, in a case where there is no registered entity that matches the target entity 20, or in a case where the registered entity matching the target entity 20 is not permitted to use the facility, the control apparatus closes the gate.

In another example, suppose that different user accounts are prepared for each registered entity in the above-described user terminal. In this case, when a registered entity matches the target entity 20 is determined, the user terminal performs the login processing with an account of the determined registered entity.

In another example, the authentication apparatus 2000 may be used for authentication for executing cashless payment. In this case, when the authentication apparatus 2000 identifies the registered entity that matches the target entity 20, payment processing is performed on the account of the registered entity. Meanwhile, when the registered entity that matches the target entity 20 is not determined, the payment processing is not performed.

The payment processing is performed by, for example, a point of sales (POS) terminal. The authentication apparatus 2000 may be implemented integrally with the POS terminal, or may be implemented separately from the POS terminal. In the latter case, for example, the authentication apparatus 2000 transmits a notification indicating the result of the authentication to the POS terminal. The notification indicates whether there is a registered entity that matches the target entity 20. Further, in a case where there is a registered entity that matches the target entity 20, the notification further indicates identification information of the registered entity that matches the target entity 20. The POS terminal performs the cashless payment processing using the received notification.

An output or the like of a message may be performed according to a result of authentication by the authentication apparatus 2000. For example, the authentication apparatus 2000 displays the authentication result on a display device that can be browsed by the target entity 20. For example, in a case where it is determined that there is no registered entity that matches the target entity 20, the authentication apparatus 2000 outputs a message such as "authentication failed" or "usage registration has not been performed". Meanwhile, in a case where it is determined that there is a registered entity that matches the target entity 20, the authentication apparatus 2000 outputs a message such as "authentication succeeded".

In another example, in a case where the symbol 42 is not detected from the target image 30, the authentication apparatus 2000 may output a message for promoting use of the attachment 40 to which the symbol 42 is attached. Suppose that there is a mask distributed to each registered entity in advance as the attachment 40 to which the symbol 42 is attached. In this case, for example, the authentication apparatus 2000 outputs a message such as "please wear the distributed mask". By outputting such a message, it is possible to call attention to use the attachment 40 on which the symbol 42 is displayed.

Note that even when the target entity 20 wears the attachment 40, in a case where the symbol 42 is not attached to the attachment 40, it can be said that the intended attachment 40 is not used. Therefore, for example, in a case where the attachment 40 is detected from the target image 30 and the symbol 42 is not detected from the target image 30, the authentication apparatus 2000 may output a message for requesting wearing of the attachment 40 to which the symbol 42 is attached instead of the attachment 40 that is currently worn. For example, in a case where a mask different from a mask distributed in advance is worn by the target entity 20, a message such as "please remove the currently worn mask and wear the distributed mask" is output. By outputting such a message, it is possible to call attention to the target entity 20 so as to use not the arbitrary attachment 40 but the attachment 40 to be worn. For example, by attaching the symbol 42 to the attachment 40 with high performance (e.g., a mask having high filtering performance) and distributing it, it is possible to avoid the attachment 40 with low performance being used.

In another example, suppose that it is determined that there is no registered entity that matches the target entity 20 in the determination using the symbol 42. In this case, the target entity 20 may be using the attachment 40 of another entity by mistake. Therefore, for example, the authentication apparatus 2000 may output a message prompting the target entity 20 to wear the attachment 40 of her/his own, such as "please wear your own mask". Furthermore, there is a possibility that the target entity 20 is trying to impersonate another entity. Therefore, the authentication apparatus 2000 may perform various warning processing.

For example, the warning processing is processing of transmitting a warning notification to a predetermined person such as a security guard. The warning notification includes, for example, a message indicating that there is a target entity 20 that attempts to impersonate another entity. Furthermore, the warning notification preferably includes the place where the authentication for the target entity 20 has been performed and the face photograph of the target entity 20 (that is, the target image 30 and the face area 32).

In another example, the authentication apparatus 2000 may put information having the same contents as those of the warning notification into the storage device. In this way, it is possible to record the existence of an entity that tries to impersonate another entity.

In another example, suppose that a registered entity matching the symbol 42 is determined from registered entities not satisfying the score condition in the determination using the symbol 42. As described above, in a case where the registered entity matching the symbol 42 does not satisfy the score condition, there is a possibility that the target entity 20 is trying to impersonate the registered entity. Therefore, also in this case, the authentication apparatus 2000 may perform various warning processing.

For example, as described above, the authentication apparatus 2000 transmits a warning message to a predetermined person such as a security guard. In another example, the authentication apparatus 2000 may transmit a notification notifying that the attachment 40 of the registered entity is used for authentication to the registered entity that does not satisfy the score condition and is determined to match the symbol 42. For example, this notification includes a message such as "your mask is being used by another person". In addition, this notification preferably includes a place where the attachment 40 is used and a photograph of an entity using the attachment 40 (that is, the target image 30 and the face area 32). By receiving such a notification, the registered entity can know that its own attachment 40 is about to be abused.

Note that, in a case where the registered entity matching the symbol 42 is determined from the registered entities not satisfying the score condition, the authentication unit 2040 needs to determine the registered entity matching the symbol 42 also for the registered entity satisfying the score condition. In this case, for example, the authentication unit 2040 first performs matching between the symbol 42 and the identification information of the registered entity for the registered entities satisfying the score condition. Then, in a case where there is no registered entity that matches the symbol 42 among the registered entities satisfying the score condition, the authentication unit 2040 also performs matching between the symbol 42 and the identification information of the registered entity for the registered entities not satisfying the score condition.

Second Example Embodiment

<Overview>

Similarly to the authentication apparatus 2000 of the first example embodiment, an authentication apparatus 2000 of the second example embodiment determines whether there is a registered entity that matches the target entity 20. However, the authentication apparatus 2000 of the second example embodiment is different from the authentication apparatus 2000 of the first example embodiment in that different types of face information 50 are used to compute the authentication score depending on whether the target entity 20 wears the attachment 40. Processing performed after the authentication score is computed is similar to that in the first example embodiment. In addition, the authentication apparatus 2000 of the second example embodiment has a function similar to that of the authentication apparatus 2000 of the first example embodiment for matters that are not particularly described.

The authentication apparatus 2000 of the second example embodiment analyzes the target image 30 before computing the authentication score to determine whether the target entity 20 wears the attachment 40. In a case where it is determined that the target entity 20 does not wear the attachment 40, the authentication unit 2040 uses first type face information 60 as the face information 50 used to compute the authentication score. The first type face information 60 indicates information about a face of the registered entity in a state where the attachment 40 is not worn. For example, the first type face information 60 indicates the image feature value of the face of the registered entity in a state where the attachment 40 is not worn. The first type face information 60 is stored in advance in a storage device accessible from the authentication unit 2040.

Meanwhile, in a case where it is determined that the target entity 20 wears the attachment 40, the authentication unit 2040 uses second type face information 70 as the face information 50 used to compute the authentication score. The second type face information 70 indicates information about the face of the registered entity in a state where the attachment 40 is worn. For example, the second type face information 70 indicates the image feature value of the face of the registered entity in the state where the attachment 40 is worn. The second type face information 70 is stored in advance in a storage device accessible from the authentication unit 2040.

<Example of Advantageous Effect>

According to the authentication apparatus 2000 of the present example embodiment, in a case where it is determined that the target entity 20 wears the attachment 40, the authentication score is computed using the information about the face of the registered entity in the state of wearing the attachment 40. Meanwhile, in a case where it is determined that the target entity 20 does not wear the attachment 40, the authentication score is computed using the face information of the registered entity in the state of not wearing the attachment 40. In this manner, the face information 50 used to compute the authentication score is appropriately selected in consideration of the state of the target entity 20. Therefore, the authentication score can be computed with higher accuracy.

Hereinafter, the authentication apparatus 2000 of the present example embodiment will be described in more detail.

<Example of Functional Configuration>

Figure 6:
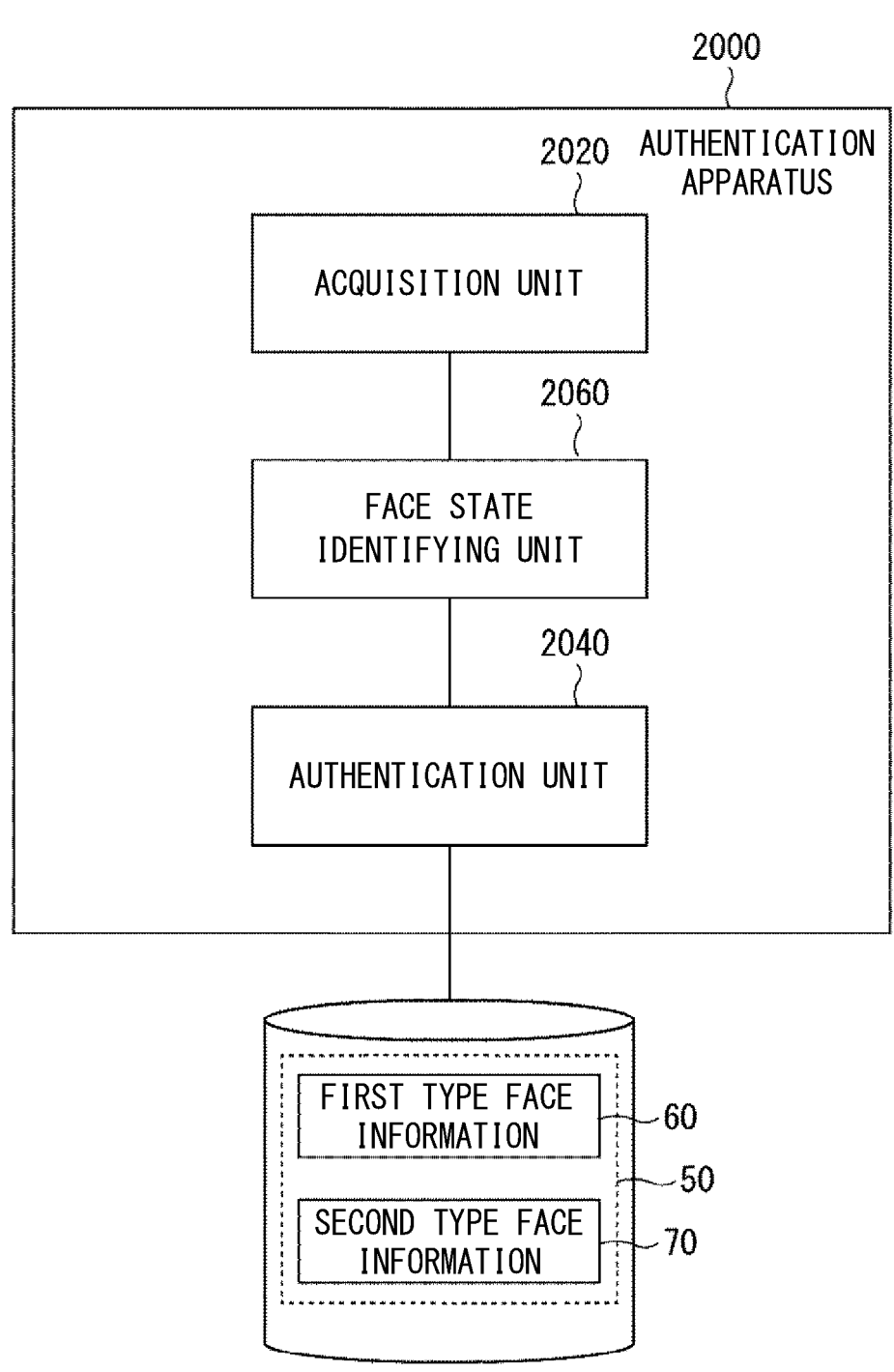
FIG. 6 is a block diagram illustrating a functional configuration of an authentication apparatus according to a second example embodiment.

FIG. 6 is a block diagram illustrating a functional configuration of the authentication apparatus 2000 of the second example embodiment. The authentication apparatus 2000 is different from the authentication apparatus 2000 of the first example embodiment in that a face state identifying unit 2060 is included. The face state identifying unit 2060 analyzes the target image 30 and determines whether the target entity 20 wears the attachment 40. In a case where it is determined that the target entity 20 does not wear the attachment 40, the authentication unit 2040 computes the authentication score for the registered entity by using the first type face information 60 as the face information 50. Meanwhile, when it is determined that the target entity 20 wears the attachment 40, the authentication unit 2040 computes the authentication score for the registered entity by using the second type face information 70 as the face information 50.

<Example of Hardware Configuration>

Similarly to the hardware configuration of the authentication apparatus 2000 of the first example embodiment, the hardware configuration of the authentication apparatus 2000 of the second example embodiment is illustrated in FIG. 3, for example. However, the storage device 508 of the second example embodiment stores a program for realizing each function of the authentication apparatus 2000 of the second example embodiment.

<Flow of Processing>

Figure 7:
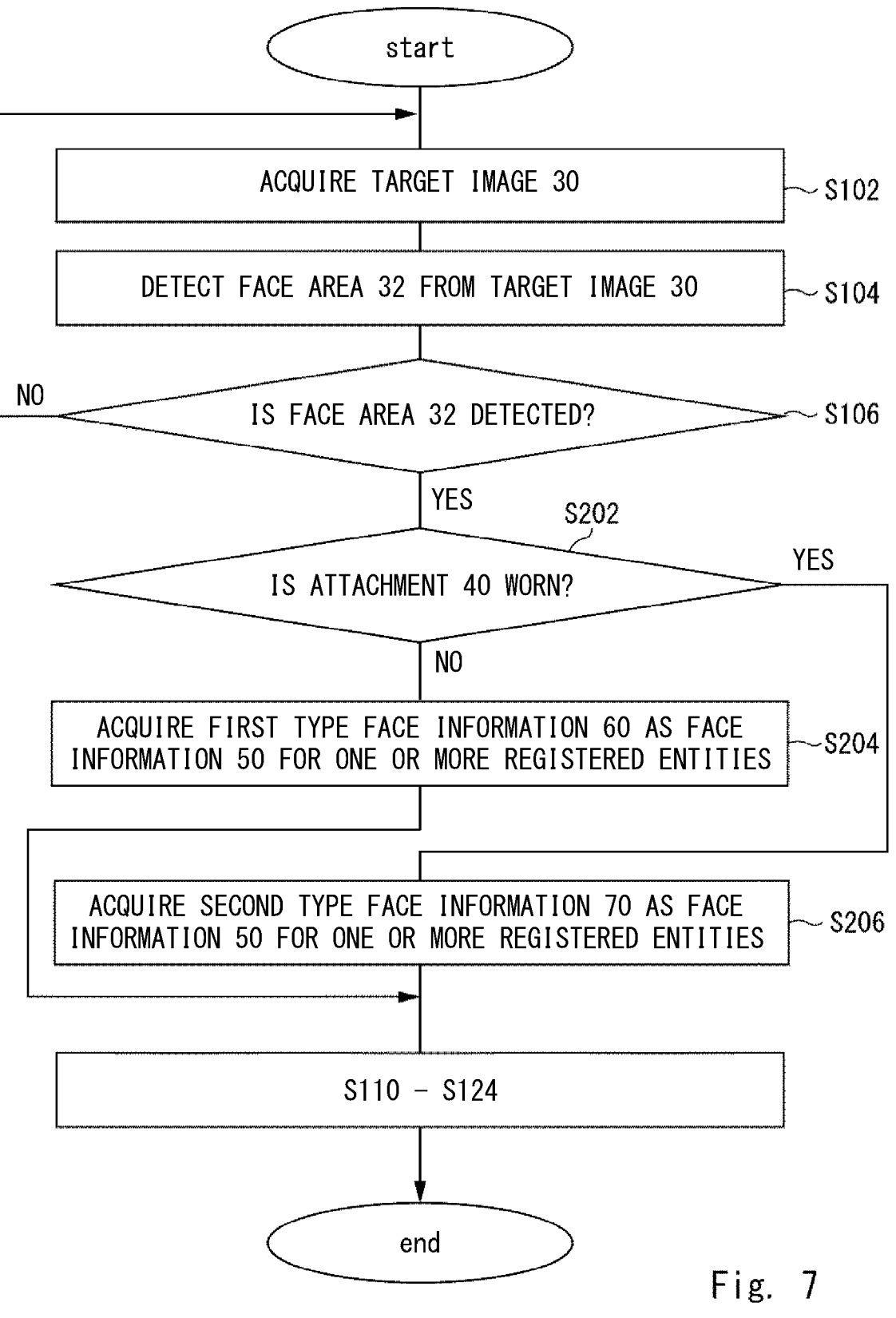
FIG. 7 is a flowchart illustrating a flow of processing executed by the authentication apparatus of the second example embodiment.

FIG. 7 is a flowchart illustrating a flow of processing executed by the authentication apparatus 2000 of the second example embodiment. The flowchart of FIG. 7 is the same as the flowchart illustrated in FIGS. 4 and 5 except that S202 to S206 are included instead of S110.

In a case where the face area 32 is detected from the target image 30 in S106 (S106: YES), the authentication unit 2040 determines whether the target entity 20 wears the attachment 40 (S202). In a case where the target entity 20 does not wear the attachment 40 (S202: NO), the authentication unit 2040 acquires the first type face information 60 as the face information 50 for each of the one or more registered entities (S204). Meanwhile, in a case where the target entity 20 wears the attachment 40 (S202: YES), the authentication unit 2040 acquires the second type face information 70 as the face information 50 for each of the one or more registered entities (S206). After S204 or S206, the authentication score is computed using the acquired face information 50 and face area 32 (S110).

<Method for Generating Second Type Face Information 70>

As described above, the second type face information 70 is information indicating the facial feature of the registered entity in the state where the attachment 40 is worn. The second type face information 70 may be generated by imaging the face of the registered entity actually wearing the attachment 40, or may be generated using the first type face information 60 without performing such imaging. That is, in the latter case, the information about the face of the registered entity in the state of not wearing the attachment 40 is used to generate the information about the face of the registered entity in the state of wearing the attachment 40. By generating the second type face information 70 from the first type face information 60 in this manner, it is not necessary to separately capture the face of the registered entity wearing the attachment 40, and thus, it is possible to reduce the burden of the registration work.

A device that generates the second type face information 70 from the first type face information 60 is referred to as a face information generating apparatus. The face information generating apparatus may be provided integrally with the authentication apparatus 2000, or may be provided separately from the authentication apparatus 2000. In the latter case, the computer that implements the face information generating apparatus has the hardware configuration illustrated in FIG. 3, for example, similarly to the computer that implements the authentication apparatus 2000.

Figure 8:
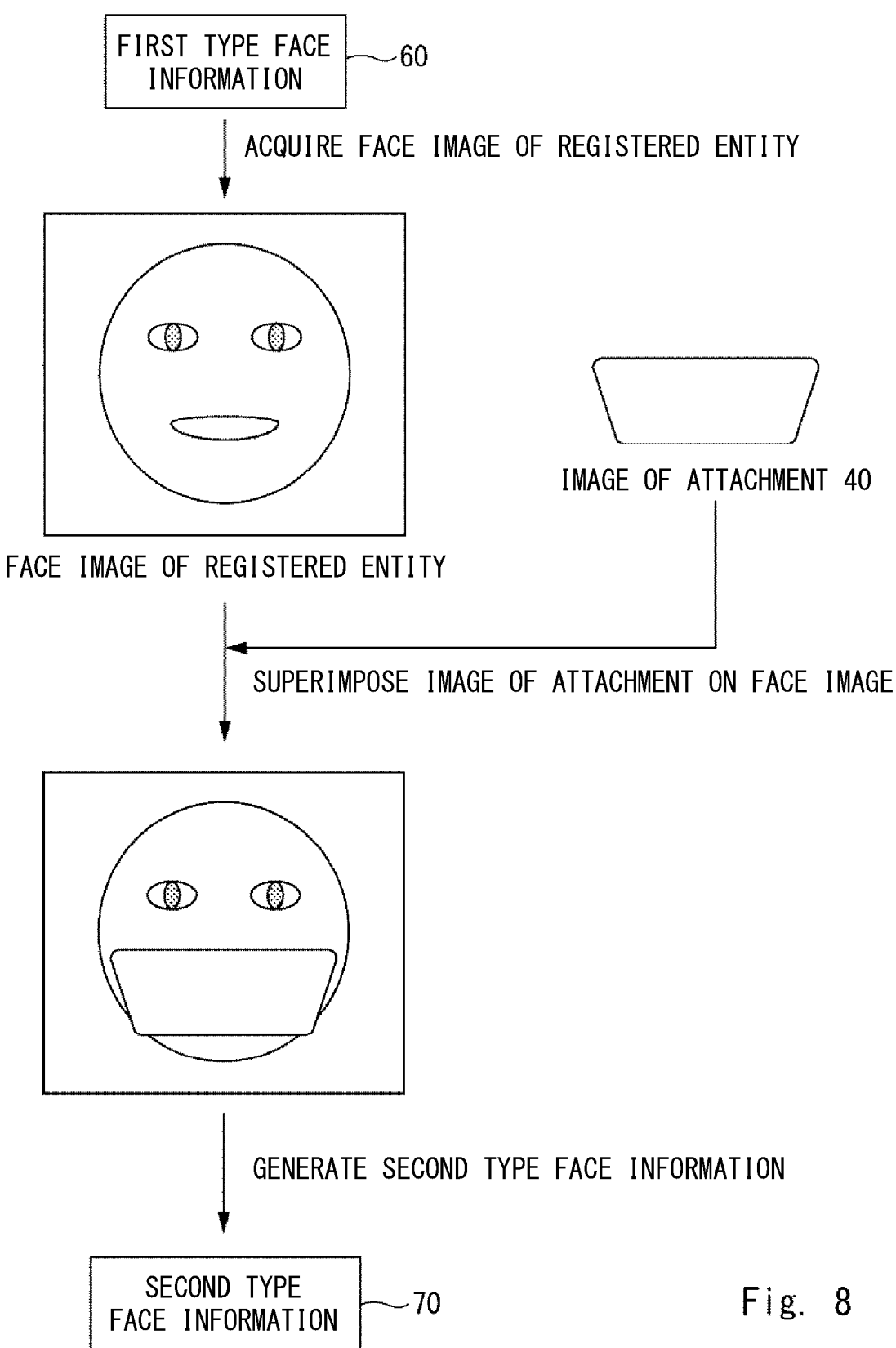
FIG. 8 is a diagram illustrating a method of generating second type face information 70.

FIG. 8 is a diagram illustrating a method of generating the second type face information 70. In this example, the first type face information 60 includes a face image of the registered entity in a state of not wearing the attachment 40. The face information generating apparatus acquires this image from the first type face information 60. The face information generating apparatus further acquires an image of the attachment 40, and superimposes this image on the face image of the registered entity acquired from the first type face information 60. In this way, it is possible to artificially generate the image of the face of the registered entity in the state of wearing the attachment 40 from the image of the face of the registered entity in the state of not wearing the attachment 40. Note that the image of the attachment 40 is stored in advance in a storage device accessible from the face information generating apparatus.

In the example of FIG. 8, the face information generating apparatus further extracts an image feature value from the image generated in this manner. As a result, the image feature value of the face of the registered entity in the state of wearing the attachment 40 is extracted. Then, the face information generating apparatus generates second type face information 70 including the image feature value. However, in addition to or instead of the image feature value, the second type face information 70 may include an image of a face of the registered entity in a state of wearing the attachment 40. Note that, in a case where the image feature value of the face of the registered entity is included in the second type face information 70, it is preferable that the image feature value of the face of the registered entity is also included in the first type face information 60. In this way, the first type face information 60 and the second type face information 70 can be handled in the same manner when computing the authentication score.

Here, as described in the first example embodiment, a plurality of types of things, such as a mask and a face shield, can be used as the attachment 40. Therefore, in a case where a plurality of types of attachments 40 can be used in the use environment of authentication apparatus 2000, the face information generating apparatus preferably generates the second type face information 70 for each of the plurality of types of attachments 40 for each registered entity. For example, for each registered entity, second type face information 70 about a state in which a mask is worn, second type face information 70 about a state in which a face shield is worn, and the like are generated.

Here, the position on the face image on which the attachment 40 is to be superimposed varies depending on the type of attachment 40. Therefore, for example, for each of the attachments 40, information defining a position on the face image on which the attachment 40 is to be superimposed is stored in advance in a storage device accessible from the face information generating apparatus. Using this information, the face information generating apparatus determines, for each type of attachments 40, a position on the face image on which the attachment 40 of that type is to be superimposed, and superimposes the attachment 40 on the determined position.

Note that the generation of the second type face information 70 may be performed in advance or may be dynamically performed when the target entity 20 is authenticated. A case where the second type face information 70 is dynamically generated will be described later.

As described above, three-dimensional data of the face may be further used to compute the authentication score. In this case, the face information generating apparatus generates the three-dimensional data of the face of the registered entity in the state of wearing the attachment 40 using the three-dimensional data of the face of the registered entity indicated by the first type face information 60 and the three-dimensional data of the attachment 40. For example, by adding the thickness of the attachment 40 to the three-dimensional data of the face on the area where the attachment 40 is superimposed, the three-dimensional data of the face of the registered entity in the state of wearing the attachment 40 can be generated.

<Determination as to Whether Attachment 40 is Worn: 202>

The face state identifying unit 2060 analyzes the face area 32 and determines whether the target entity 20 wears the attachment 40 (S202). There are various methods for determining whether the attachment 40 is worn. For example, the face state identifying unit 2060 detects, from the face area 32, an area having an image feature value matching (similarity thereof is equal to or greater than a threshold) the image feature value of the attachment 40. In a case where an area having an image feature value matching the image feature value of the attachment 40 is detected from the face area 32, the face state identifying unit 2060 determines that the target entity 20 wears the attachment 40. Meanwhile, in a case where the area having the image feature value matching the image feature value of the attachment 40 is not detected from the face area 32, the face state identifying unit 2060 determines that the target entity 20 does not wear the attachment 40.

Note that the image feature value of the attachment 40 is stored in advance in a storage device accessible from the face state identifying unit 2060. For example, in a case where a mask can be worn as the attachment 40, information indicating the image feature value of the mask is prepared.

In another example, a trained identification model for identifying whether the person wears the attachment 40 in response to the input of the face image of the person may be prepared. In this case, by inputting the face area 32 to the identification model, the face state identifying unit 2060 acquires a determination result as to whether the target entity 20 wears the attachment 40 from the identification model. Note that this training of the identification model can be performed using training data configured by a pair of "a face image, and a ground-truth label (label indicating whether the attachment 40 is worn)".

In a case where there are a plurality of types of objects that can be used as the attachments 40, the face state identifying unit 2060 determines, for each of the plurality of types of attachments 40, whether the target entity 20 wears that type of attachment 40. In a case where it is determined, regarding a certain type of attachment 40, that the target entity 20 wears that type of the attachment 40, the authentication unit 2040 acquires the second type face information 70 for that type of the attachment 40 for each registered entity. Meanwhile, in a case where it is determined, for each type of attachments 40, that the target entity 20 does not wear that type of attachments 40, the authentication unit 2040 acquires the first type face information 60 for each registered entity.

For example, in a case where the attachment 40 is detected using the image feature value, the image feature value is prepared for each type of the attachment 40. For each type of the attachments 40, the face state identifying unit 2060 detects, from the face area 32, an image area having an image feature value matching the image feature value of the type of the attachment 40. Meanwhile, in the case of using the identification model, the identification model for identifying whether the attachment 40 of the type is attached is prepared for each type of the attachment 40. The face state identifying unit 2060 inputs the face area 32 to each identification model. In this way, for each type of attachments 40, the determination result as to whether target entity 20 wears that type of attachments 40 can be obtained.

As described above, the second type face information 70 may be dynamically generated when authentication is performed on the target entity 20. In this case, the face state identifying unit 2060 identifies the type of the attachment 40 worn by the target entity 20. Then, the face information generating apparatus acquires the image of the specified type of the attachment 40 and the first type face information 60 for each registered entity, and generates the second type face information 70 using these.

In a case where a plurality of types of attachments 40 are worn by the target entity 20, it is preferable that the face information generating apparatus generates the second type face information 70 about the registered entity in a state where the plurality of types of attachments 40 are worn. For example, in a case where it is determined that the target entity 20 wears the mask and the sunglasses, it is preferable to generate the second type face information 70 about the state of wearing the mask and the sunglasses for each registered entity.

For this purpose, the face information generating apparatus acquires the image of each of the plurality of types of attachments 40 determined to be worn by the target entity 20 and the first type face information 60 about each registered entity. Then, the face information generating apparatus superimposes the acquired image of each of the plurality of types of attachments 40 on the face image of the registered entity. As a result, a face image of the registered entity in a state where the plurality of types of attachments 40 are worn is generated. The face information generating apparatus generates the second type face information 70 using the face image of the registered entity generated in this manner.

As described above, according to the method of generating the second type face information 70 about the state of wearing the attachment 40 after the attachment 40 is worn by the target entity 20 is determined, there is an advantage that the face information 50 to be prepared in advance for the registered entity can be reduced. Suppose that five types of objects can be used as the attachments 40. In this case, 31 patterns of attachment patterns of the attachment 40 by the target entity 20 are possible. Therefore, in a case where the second type face information 70 is prepared in advance, it is necessary to prepare one piece of the first type face information 60 and 31 types of the second type face information 70 for each registered entity. Meanwhile, in a case where the second type face information 70 is dynamically generated, the first type face information 60 may be prepared for each one of registered entities. Therefore, the amount of information that needs to be prepared in advance can be reduced.

Third Example Embodiment

An authentication apparatus 2000 of a third example embodiment determines whether there is a registered entity that matches the target entity 20, similarly to the authentication apparatus 2000 of the first example embodiment. However, the authentication apparatus 2000 of the third example embodiment is different from the authentication apparatus 2000 of the first example embodiment in that the symbol 42 is first detected from the target image 30 and processing according to the detection result is performed. In addition, the authentication apparatus 2000 of the third example embodiment has a function similar to that of the authentication apparatus 2000 of the first example embodiment for matters that are not particularly described.

<Example of Functional Configuration>

A functional configuration of the authentication apparatus 2000 of the third example embodiment is illustrated in FIG. 2, for example, similarly to the functional configuration of the authentication apparatus 2000 of the first example embodiment. However, an authentication unit 2040 of the third example embodiment operates as follows. The authentication unit 2040 detects the symbol 42 from the target image 30. In a case where the symbol 42 is not detected from the target image 30, the authentication unit 2040 computes an authentication score for one or more registered entities. In a case where there is a registered entity whose authentication score is greater than the first threshold, the authentication unit 2040 determines that there is a registered entity that matches the target entity 20. Meanwhile, in a case where there is no registered entity whose authentication score is greater than the first threshold, the authentication unit 2040 determines that there is no registered entity that matches the target entity 20.

In a case where the symbol 42 is detected from the target image 30, the authentication unit 2040 computes an authentication score for the registered entity matching the symbol 42, and determines whether the authentication score is greater than the second threshold. Here, as described above, the second threshold is a value smaller than the first threshold. In a case where the authentication score of the registered entity matching the symbol 42 is greater than the second threshold, the authentication unit 2040 determines that there is a registered entity that matches the target entity 20. Meanwhile, in a case where the authentication score is equal to or less than the second threshold, the authentication unit 2040 determines that there is no registered entity that matches the target entity 20.

<Example of Advantageous Effect>

In a case where the symbol 42 is detected from the target image 30, it is possible to narrow down registered entities that may match the target entity 20 by determining registered entities that match the symbol 42. In addition, based on the fact that the target entity 20 wears the attachment 40 on which the symbol 42 matching the registered entity is displayed, it is considered that a probability that there is the registered entity that matches the target entity 20 is high to some extent. Therefore, in a case where the symbol 42 is detected from the target image 30 and the registered entity matching the symbol 42 is determined, the authentication of the target entity 20 can be accurately realized even when the degree of severity of the determination based on the authentication score is lowered to some extent as compared with other cases.

Therefore, in the authentication apparatus 2000 of the present example embodiment, a value lower than the threshold in a case where the symbol 42 is not detected is used as the threshold of the authentication score in a case where the symbol 42 is detected. This makes it possible to accurately authenticate the target entity 20 in a situation where the authentication score is lowered due to a part of the face being hidden by the attachment 40.

<Example of Hardware Configuration>

Similarly to the hardware configuration of the authentication apparatus 2000 of the first example embodiment, the hardware configuration of the authentication apparatus 2000 of the third example embodiment is illustrated in FIG. 3, for example. However, the storage device 508 of the third example embodiment stores a program for realizing each function of the authentication apparatus 2000 of the second example embodiment.

<Flow of Processing>

Figure 9:
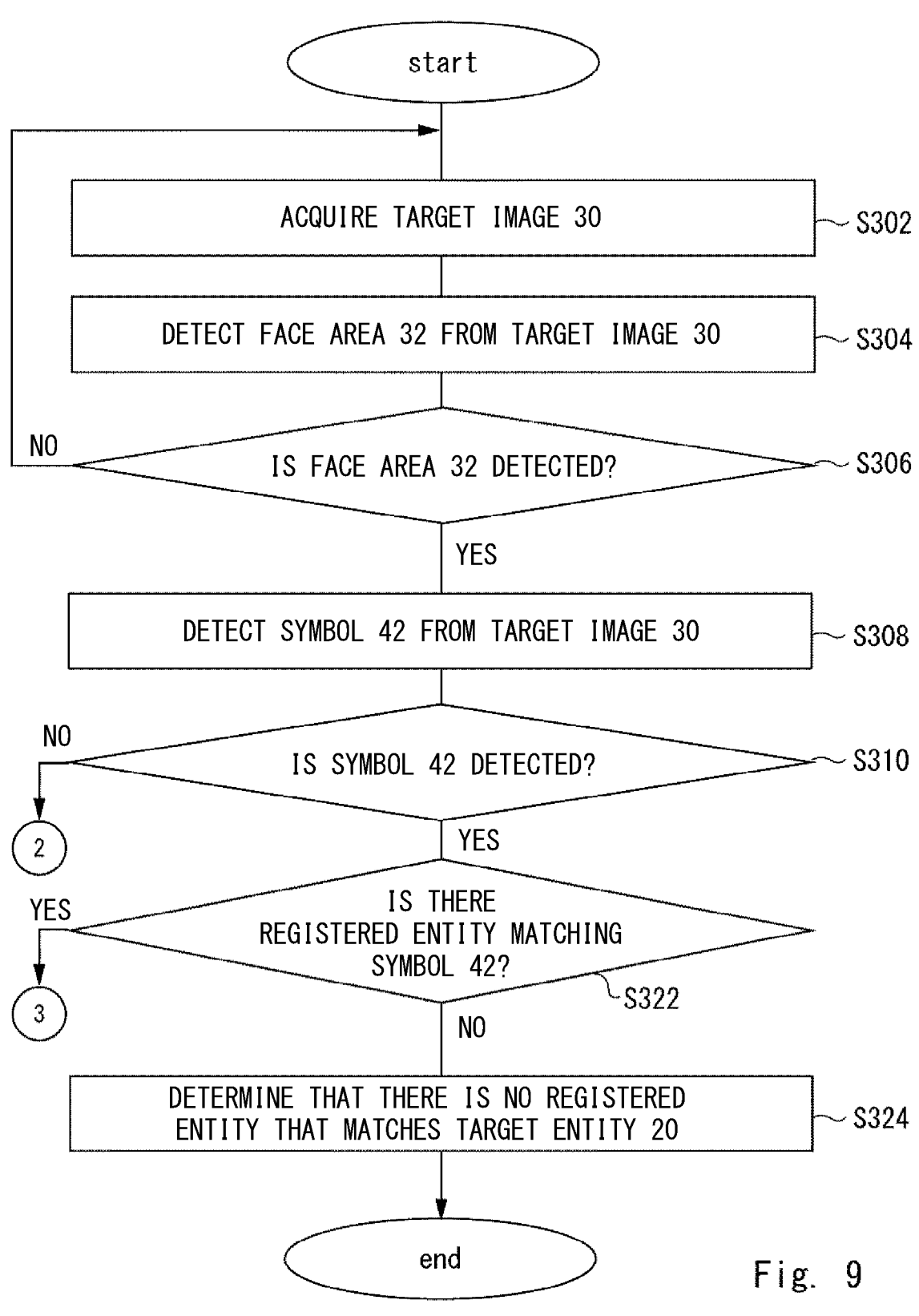
FIG. 9 is a flowchart illustrating a flow of processing executed by an authentication apparatus of a third example embodiment.
Figure 10:
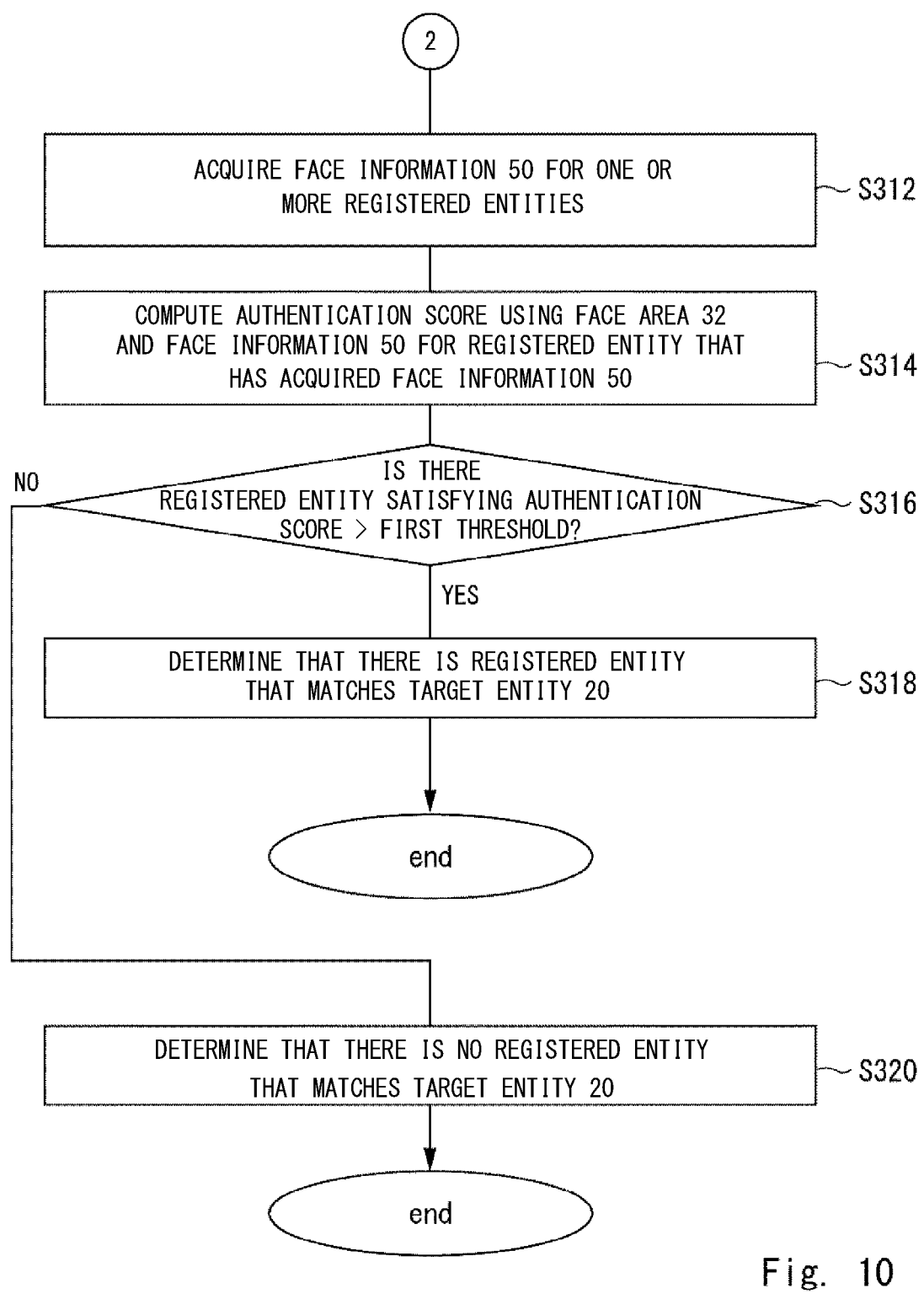
FIG. 10 is a flowchart illustrating the flow of the processing executed by the authentication apparatus of the third example embodiment.
Figure 11:
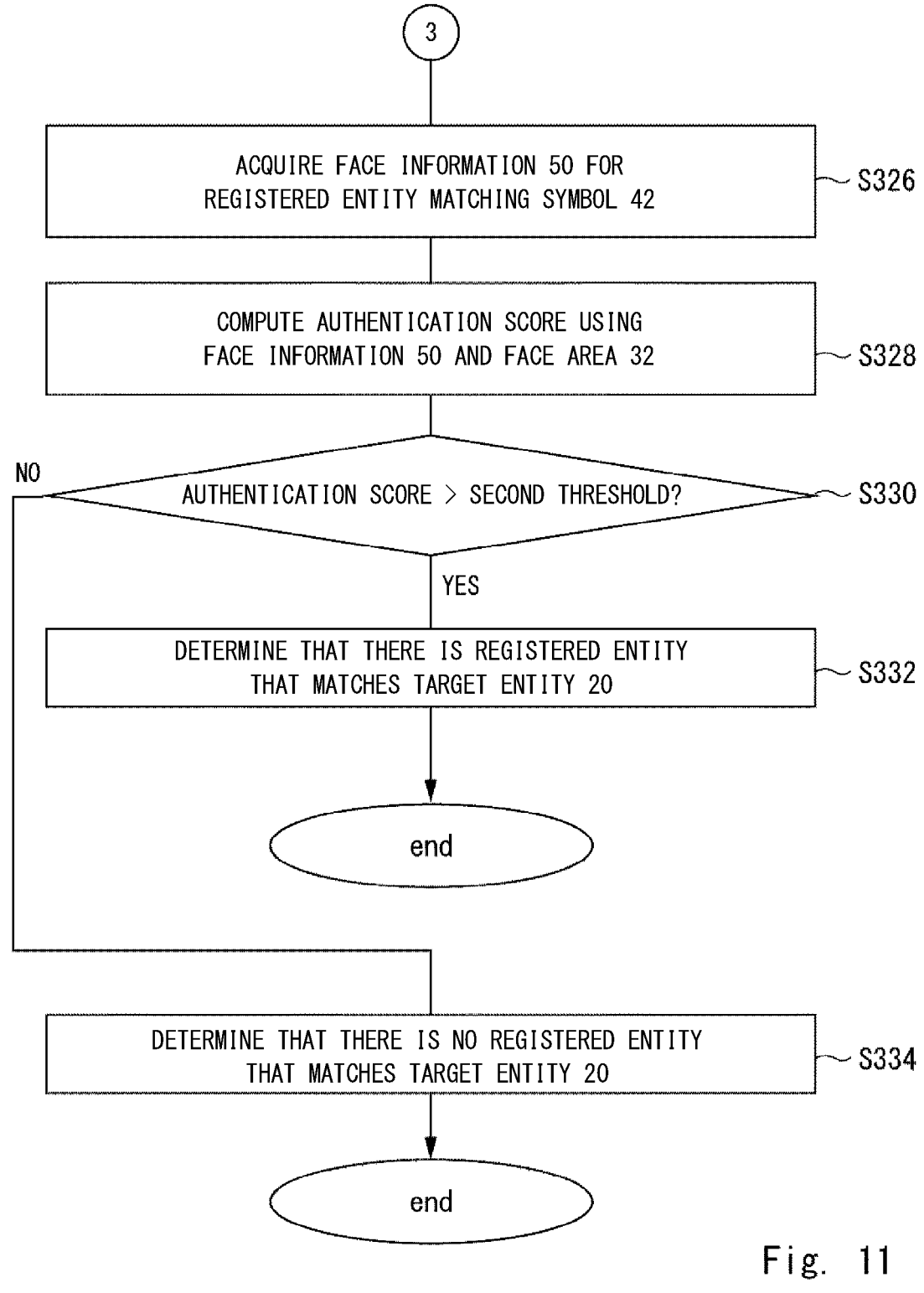
FIG. 11 is a flowchart illustrating the flow of the processing executed by the authentication apparatus of the third example embodiment.

FIGS. 9 to 11 are flowcharts illustrating a flow of processing executed by the authentication apparatus 2000 of the third example embodiment. The acquisition unit 2020 acquires the target image 30 (S302). The authentication unit 2040 detects the face area 32 from the target image 30 (S304). In a case where the face area 32 is not detected from the target image 30 (S306: NO), the process of FIG. 9 returns to S302. That is, the processing in and after S308 is performed only for the captured image including the face area 32 among the captured images generated by the camera 10. In a case where the face area 32 is detected from the target image 30 (S306: YES), the authentication unit 2040 detects the symbol 42 from the target image 30 (S308). In a case where the symbol 42 is not detected from the target image 30 (S310: NO), the authentication unit 2040 acquires the face information 50 for each of the one or more registered entities (S312). Note that S312 to S320 are illustrated in FIG. 10.

The authentication unit 2040 computes the authentication score using the face area 32 and the face information 50 for each registered entity that has acquired the face information 50 (S314). The authentication unit 2040 determines whether there is a registered entity whose authentication score is greater than the first threshold (S316). In a case where there is a registered entity whose authentication score is greater than the first threshold (S316: YES), the authentication unit 2040 determines that there is a registered entity that matches the target entity 20 (S318). Meanwhile, in a case where there is no registered entity whose authentication score is greater than the first threshold (S316: NO), the authentication unit 2040 determines that there is no registered entity that matches the target entity 20 (S320).

Hereinafter, FIG. 9 is referred to again. In a case where the symbol 42 is detected from the target image 30 (S310: YES), the authentication unit 2040 determines whether there is a registered entity matching the symbol 42 (S322). In a case where there is no registered entity matching the symbol 42 (S322: NO), the authentication unit 2040 determines that there is no registered entity that matches the target entity 20 (S324). In a case where there is a registered entity matching the symbol 42 (S322: YES), the authentication unit 2040 acquires the face information 50 for the registered entity matching the symbol 42 (S326). Note that S326 to S334 are illustrated in FIG. 11.

The authentication unit 2040 computes the authentication score using the acquired face information 50 and the face area 32 (S328). The authentication unit 2040 determines whether the authentication score is greater than a second threshold (S330). Here, the second threshold is a value smaller than the first threshold. In a case where the authentication score is greater than the second threshold (S330: YES), the authentication unit 2040 determines that there is a registered entity that matches the target entity 20 (S332). Meanwhile, in a case where the authentication score is equal to or less than the second threshold (S330: NO), the authentication unit 2040 determines that there is no registered entity that matches the target entity 20 (S334).

<Use of Second Type Face Information 70>

In a case where the symbol 42 is detected from the target image 30, the target entity 20 wears the attachments 40. Therefore, the authentication unit 2040 may use the second type face information 70 described in the second example embodiment to compute the authentication score for the registered entity matching the symbol 42.

Fourth Example Embodiment

Similarly to the authentication apparatus 2000 of the first example embodiment, the authentication apparatus 2000 of the fourth example embodiment authenticates the target entity 20 using the target image 30. However, the authentication apparatus 2000 is different from the authentication apparatuses of the first to third example embodiments in that the authentication score is not used.

The authentication apparatus 2000 of the fourth example embodiment has a function similar to that of the authentication apparatus 2000 of the first example embodiment for matters that are not particularly described.

<Example of Functional Configuration>

The functional configuration of the authentication apparatus 2000 of the fourth example embodiment is illustrated in FIG. 2 similarly to the functional configuration of the authentication apparatus 2000 of the first example embodiment. The acquisition unit 2020 of the fourth example embodiment acquires the target image 30. The authentication unit 2040 of the fourth example embodiment 1) detects the face area 32 from the target image 30, 2) detects the symbol 42 from the face area 32, and 3) determines whether there is a registered entity matching the symbol 42. In a case where there is a registered entity matching the symbol 42, the authentication unit 2040 determines that there is a registered entity that matches the target entity 20. Meanwhile, when there is no registered entity matching the symbol 42, the authentication unit 2040 determines that there is no registered entity that matches the target entity 20.

<Example of Advantageous and Effect>

From the viewpoint of infection prevention and the like, an environment in which many people wear masks and the like is considered. In such an environment, it can be said that it is more convenient to use a mask or the like as a medium for authentication than to separately prepare a company ID card or the like carried from the neck as a medium for authentication.

Therefore, the authentication apparatus 2000 of the present example embodiment detects the symbol 42 displayed on the attachment 40 from the face image of the target entity 20, and authenticates the target entity 20 using the symbol 42. In this way, the authentication of the target entity 20 can be realized by a method highly convenient for the target entity 20.

In addition, in the authentication apparatus 2000 of the present example embodiment, the load of the processing required for the authentication of the target entity 20 is reduced as compared with the case of performing the authentication of the target entity 20 by computing the authentication score and comparing the authentication score with the threshold. Therefore, there is an advantage that the time required for authentication of the target entity 20 is shortened.

<Example of Hardware Configuration>

The hardware configuration of the authentication apparatus 2000 of the fourth example embodiment is illustrated in FIG. 3, for example, similarly to the hardware configuration of the authentication apparatus 2000 of the first example embodiment. However, the storage device 508 of the fourth example embodiment stores a program for realizing each function of the authentication apparatus 2000 of the fourth example embodiment.

<Flow of Processing>

Figure 12:
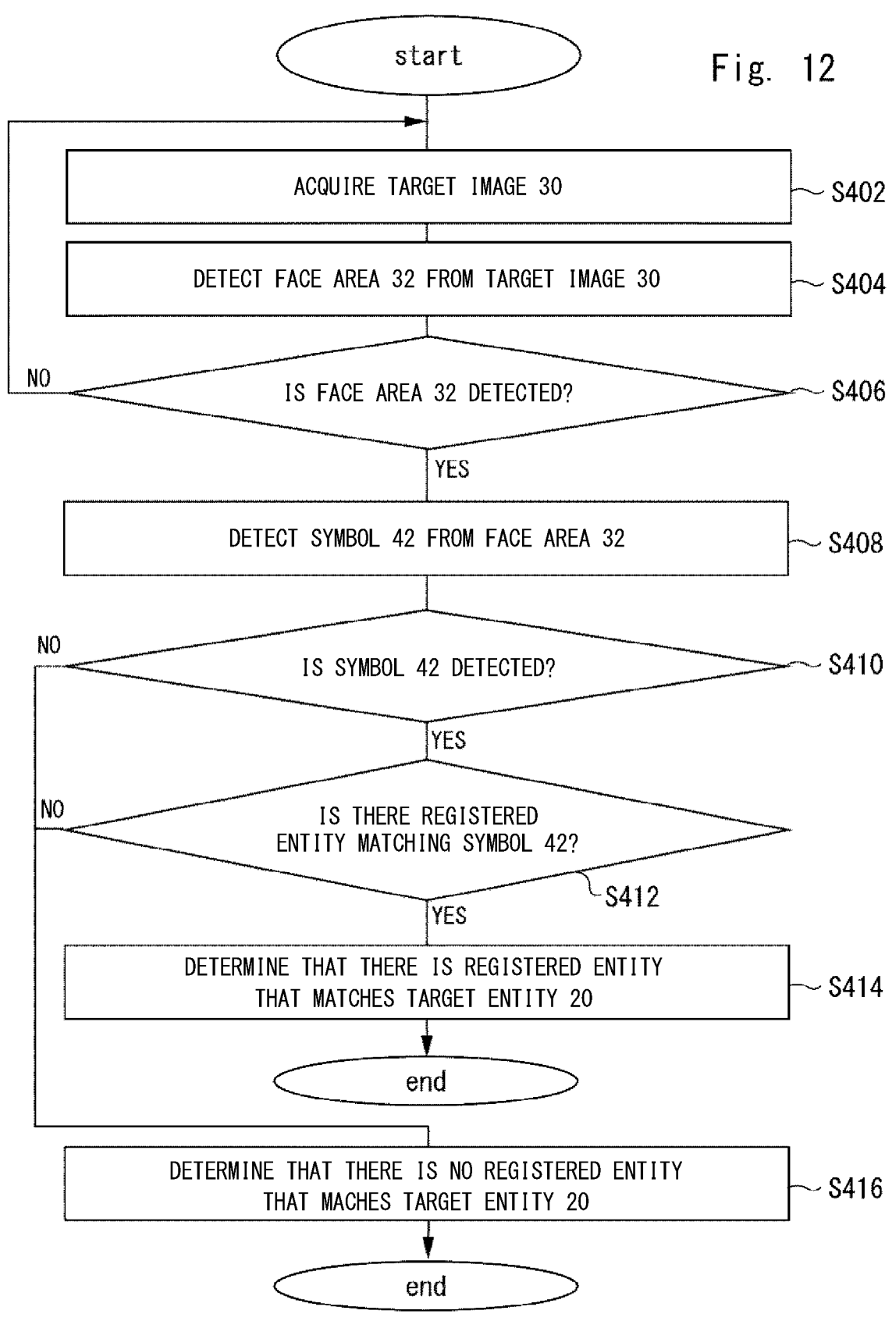
FIG. 12 is a flowchart illustrating a flow of processing executed by an authentication apparatus of a fourth example embodiment.

FIG. 12 is a flowchart illustrating a flow of processing executed by the authentication apparatus 2000 of the fourth example embodiment. The acquisition unit 2020 acquires the target image 30 (S402). The authentication unit 2040 detects the face area 32 from the target image 30 (S404). In a case where the face area 32 is not detected from the target image 30 (S406: NO), the processing of FIG. 12 returns to S402. That is, the processing in and after S408 is performed only for the captured image including the face area 32 among the captured images generated by the camera 10.

In a case where the face area 32 is detected from the target image 30 (S406: YES), the authentication unit 2040 detects the symbol 42 from the face area 32 (S408). In a case where the symbol 42 is not detected from the target image 30 (S408: NO), the authentication unit 2040 determines that there is no registered entity that matches the target entity 20 (S416).

In a case where the symbol 42 is detected from the face area 32 (S408: YES), the authentication unit 2040 determines whether there is a registered entity that matches the symbol 42 (S412). In a case where there is a registered entity matching the symbol 42 (S412: YES), the authentication unit 2040 determines that there is a registered entity that matches the target entity 20 (S414). Meanwhile, in a case where there is no registered entity matching the symbol 42 (S412: NO), the authentication unit 2040 determines that there is no registered entity that matches the target entity 20 (S416).

Fifth Example Embodiment

<Overview>

The authentication apparatus 2000 of a fifth example embodiment authenticates the target entity 20 similarly to the authentication apparatus 2000 of the first example embodiment. However, the authentication apparatus 2000 of the fifth example embodiment is different from the authentication apparatus 2000 of the first example embodiment in that it is determined whether there is a registered entity that matches the target entity 20 in a specific group. The authentication apparatus 2000 of the fifth example embodiment has a function similar to that of the authentication apparatus 2000 of the first example embodiment for matters that are not particularly described.

In an environment in which the authentication apparatus 2000 of the fifth example embodiment is used, the registered entities are divided into a plurality of groups in advance. For example, in a company, it is possible to provide a group of employees and a group of guests. It is also possible to be divided into a group of registered entities that provide the service and a group of registered entities that use the service.

The authentication apparatus 2000 of the fifth example embodiment first determines whether there is a registered entity that matches the target entity 20 in a default group. The group handled as the default group is determined in advance. For example, in the above-described example of the groups, a group of employees or a group that provides services is handled as a default group.

Specifically, the authentication apparatus 2000 computes the authentication score for the registered entity belonging to the default group by using the target image 30 and the face information 50. In a case where there is a registered entity whose authentication score is greater than the first threshold, it is determined that there is a registered entity that matches the target entity 20 in the default group.

In a case where there is no registered entity that matches the target entity 20 in the default group, the authentication apparatus 2000 determines whether there is a registered entity that matches the target entity 20 in the group (hereinafter, a group matching the symbol 42) associated with the identification information represented by the symbol 42. Here, in an environment using the authentication apparatus 2000 of the present example embodiment, a group is associated with identification information of the symbol 42. In addition, a person belonging to a group other than the default group wears the attachment 40 on which the symbol 42 matching the group is displayed. Therefore, the authentication apparatus 2000 determines a group matching the symbol 42 included in the target image 30.

The authentication apparatus 2000 computes an authentication score for a registered entity belonging to a group matching the symbol 42. In a case where there is a registered entity whose authentication score is greater than the second threshold, the authentication apparatus 2000 determines that there is a registered entity that matches the target entity 20 in the group matching the symbol 42. Meanwhile, in a case where there is no registered entity whose authentication score is greater than the second threshold, the authentication apparatus 2000 determines that there is no registered entity that matches the target entity 20.

Here, the method of associating the identification information of the symbol 42 with the group is similar to the method of associating the identification information of the symbol 42 with the registered entity in the first example embodiment. For example, the symbol 42 matching a certain group represents identification information of the group. In another example, association information indicating association between the identification information represented by the symbol 42 and the identification information of the group is stored in advance in the storage device. The identification information of the symbol 42 and the group matching each other is associated with each other in the association information.

<Example of Advantageous and Effect>

According to the authentication apparatus 2000 of the present example embodiment, first, the facial feature of the registered entity belonging to the default group is compared with the facial feature of the target entity 20 to determine whether the registered entity that matches the target entity 20 exists in the default group. Therefore, when the target entity 20 is an entity registered as the default group, there is no need to perform processing using the symbol 42. Therefore, for example, by setting a group to which the target entity 20 belongs with a relatively high probability as the default group, the time required for authentication of the target entity 20 can be shortened. For example, it is possible to set a group of company employees as a default group in a company.

In addition, according to the authentication apparatus 2000 of the present example embodiment, the registered entity for comparing the facial feature with the target entity 20 is limited to the registered entity belonging to the group specified by the symbol 42. Therefore, it is possible to shorten the time required for authentication of the target entity 20 as compared with a case where all the registered entities are to be compared.

Further, in the authentication apparatus 2000 of the present example embodiment, the threshold (second threshold) of the authentication score computed for the registered entity belonging to the group matching the symbol 42 is set to a value smaller than the threshold (first threshold) of the authentication score computed for the registered entity belonging to the default group. Here, suppose that the number of registered entities belonging to the group matching the symbol 42 is smaller than the number of registered entities belonging to the default group. According to this assumption, by setting the second threshold to a value smaller than the first threshold, it is possible to increase the probability that the registered entity that matches the target entity 20 can be determined while maintaining the accuracy of authentication (in other words, false negatives can be reduced.).

<Example of Functional Configuration>

The functional configuration of the authentication apparatus 2000 of the fifth example embodiment is illustrated in FIG. 2, for example, similarly to the authentication apparatus 2000 of the first example embodiment. However, the authentication unit 2040 of the fifth example embodiment operates as follows. The authentication unit 2040 computes the authentication score for one or more registered entities belonging to the default group by using the target image 30 and the face information 50. In a case where there is a registered entity whose authentication score is greater than the first threshold, the authentication unit 2040 determines that there is a registered entity that matches the target entity 20 in the default group.

In a case where there is no registered entity whose authentication score is greater than the first threshold, the authentication unit 2040 detects the symbol 42 from the target image 30 and computes the authentication score for one or more registered entities belonging to a group matching the symbol 42 by using the target image 30 and the face information 50. In a case where there is a registered entity whose authentication score is greater than the second threshold, the authentication unit 2040 determines that there is a registered entity that matches the target entity 20 in the group matching the symbol 42.

<Example of Hardware Configuration>

Similarly to the hardware configuration of the authentication apparatus 2000 of the first example embodiment, the hardware configuration of the authentication apparatus 2000 of the fifth example embodiment is illustrated in FIG. 3, for example. However, the storage device 508 of the fifth example embodiment stores a program for realizing each function of the authentication apparatus 2000 of the second example embodiment.

<Flow of Processing>

Figure 13:
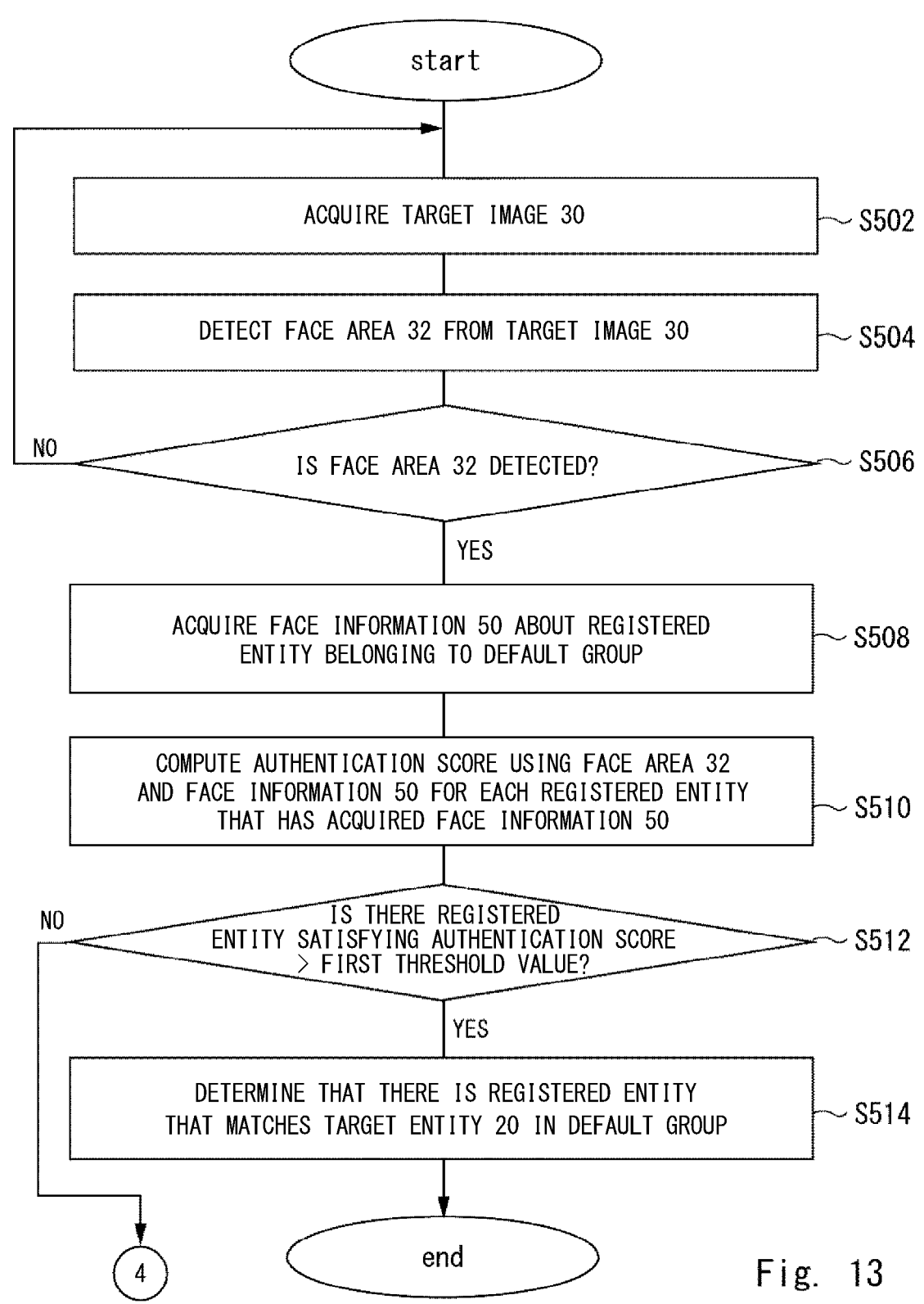
FIG. 13 is a flowchart illustrating a flow of processing executed by an authentication apparatus of a fifth example embodiment.
Figure 14:
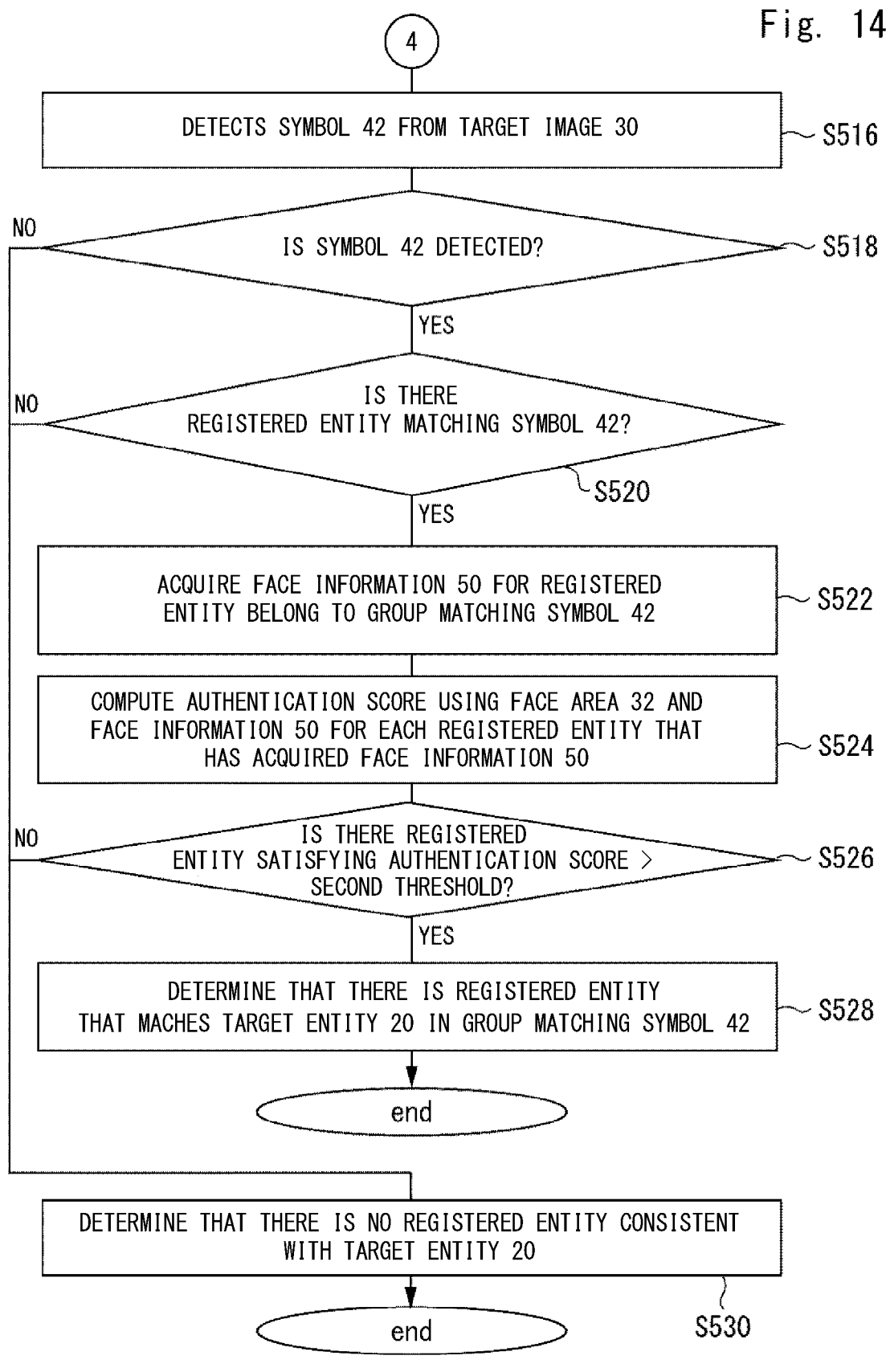
FIG. 14 is a flowchart illustrating the flow of the processing executed by the authentication apparatus of the fifth example embodiment.

FIGS. 13 and 14 are flowcharts illustrating a flow of processing executed by the authentication apparatus 2000 of the fifth example embodiment. The acquisition unit 2020 acquires the target image 30 (S502). The authentication unit 2040 detects the face area 32 from the target image 30 (S504). In a case where the face area 32 is not detected from the target image 30 (S506: NO), the processing of FIG. 13 returns to S502. That is, the processing in and after S508 is performed only for the captured image including the face area 32 among the captured images generated by the camera 10.

In a case where the face area 32 is detected from the target image 30 (S506: YES), the authentication unit 2040 acquires the face information 50 about the registered entity belonging to the default group (S508), and computes the authentication score using the acquired face information 50 and the face area 32 (S510). The authentication unit 2040 determines whether there is a registered entity whose authentication score is greater than the first threshold in the default group (S512). In a case where there is a registered entity whose authentication score is greater than the first threshold (S512: YES), the authentication unit 2040 determines that there is a registered entity that matches the target entity 20 in the default group (S514). When there is no registered entity whose authentication score is greater than the first threshold (S512: NO), the authentication unit 2040 detects the symbol 42 from the target image 30 (S516). Note that the processing in and after S516 is illustrated in FIG. 14.

In a case where the symbol 42 is not detected (S518: NO), the authentication unit 2040 determines that there is no registered entity that matches the target entity 20 (S530). Meanwhile, in a case where the symbol 42 is detected (S518: YES), the authentication unit 2040 determines whether there is a group matching the symbol 42 (S520).

In a case where there is no group matching the symbol 42 (S520: NO), the authentication unit 2040 determines that there is no registered entity that matches the target entity 20 (S530). Meanwhile, in a case where there is a group matching the symbol 42, the authentication unit 2040 acquires the face information 50 for the registered entity included in the group (S522), and computes an authentication score for each registered entity (S524). The authentication unit 2040 determines whether there is a registered entity having an authentication score greater than the second threshold in the group matching the symbol 42 (S526). In a case where there is a registered entity whose authentication score is greater than the second threshold (S526: YES), the authentication unit 2040 determines that there is a registered entity that matches the target entity 20 in the group matching the symbol 42 (S528). Meanwhile, in a case where there is no registered entity whose authentication score is greater than the second threshold (S526: NO), the authentication unit 2040 determines that there is no registered entity that matches the target entity 20 (S530).

<As to Group>

In the present example embodiment, for each group, it is necessary to be able to acquire the face information 50 for the registered entity belonging to that group. Therefore, for example, information in which identification information of a registered entity is associated with identification information of a group to which the registered entity belongs is stored in advance in a storage device accessible from the authentication unit 2040. Hereinafter, this information is referred to as group information. The authentication unit 2040 acquires the group information from the storage device to know the association between the group and the registered entity.

For example, in a case where the face information 50 of the registered entity belonging to the default group is acquired, the authentication unit 2040 refers to the group information to determine the identification information of each registered entity belonging to the default group. Then, the authentication unit 2040 acquires the face information 50 of each registered entity belonging to the default group by using the identification information of each determined registered entity.

In addition, the authentication unit 2040 determines a group matching the symbol 42 using the symbol 42. Note that a method of determining a group matching the symbol 42 is similar to a method of determining a registered entity matching the symbol 42. Then, for the group determined in this way, the authentication unit 2040 refers to the group information to determine each registered entity belonging to the group.

<Example of Manner of Usage>

For example, the authentication apparatus 2000 of the present example embodiment is used to distinguish and authenticate an employee and a guest of a company in a facility of the company. In this case, the registered entity that belongs to the default group is an employee. Furthermore, the group determined by the symbol 42 is a group of guests. Note that there may be only one group of guests, or there may be a plurality of groups of guests. For example, a group is associated with each of a plurality of areas in a facility. In this case, each guest is included in the group corresponding to the area allowed to be used by the guest.

The symbol 42 representing a group to which the guest belongs needs to be displayed on the attachment 40 worn by the guest. Therefore, for example, at the entrance of the facility, the attachment 40 is distributed to the guest. On this attachment 40, the symbol 42 matching the group corresponding to an area where the guest is permitted to use is displayed. However, the symbol 42 that can be attached to attachments 40 may be distributed such that the attachments 40 brought by the guest can be used. For example, it is possible to distribute a seal on which the symbol 42 is displayed.

In addition, each guest needs to be registered as a registered entity in advance before authentication. Therefore, for example, at the entrance of the facility, the face of the guest is captured by a camera, and the face information 50 is generated from the face image of the guest. Note that authentication of the guest may also be performed at the exit of the facility, and the registration of the guest may be deleted based on the result of the authentication. That is, at the exit of the facility, when it is determined that there is a registered entity that matches the target entity 20 in the group matching the symbol 42, the face information 50 on the registered entity is deleted.

In each area of the facility, authentication using the authentication apparatus 2000 is performed. For example, suppose that there is a single group of guests, and authentication is performed by the authentication apparatus 2000 in an area that the guests are allowed to use. In a case where it is determined that there is a registered entity that matches the target entity 20 in the group matching the symbol 42, the target entity 20 may enter the area (for example, the gate is opened by the control apparatus described above.). Meanwhile, when it is determined that there is no registered entity that matches the target entity 20 in the group matching the symbol 42, the target entity 20 cannot enter the area (for example, the gate is closed by the control apparatus described above.).

In a similar case, suppose that there are a plurality of groups of guests. In this case, in a case where it is determined that there is a registered entity that matches the target entity 20 in the group matching the symbol 42 and the area is allowed to be used by the group matching the symbol 42, the target entity 20 can enter the area. Meanwhile, in a case where it is determined that there is no registered entity that matches the target entity 20 in the group matching the symbol 42 or where authentication is performed in an area that is not allowed to be used by the group matching the symbol 42, the target entity 20 cannot enter the area.

Here, various facilities and guests of the company can be assumed. For example, suppose that the authentication apparatus 2000 is used for authentication in an office of a company. In this case, the facility is an office, and the guest is a person who visits the office (for example, an employee of a client company).

In another example, suppose that the authentication apparatus 2000 is used for authentication in a facility used by a general user, such as an airport. The facilities in this case are various facilities used by general users, such as airports. In addition, the guest is a person who uses the facility or the like.

For example, at an airport, a plurality of airline companies may provide different services. Therefore, for example, a group identified by the symbol 42 is provided for each airline. In addition, the guest wears the attachment 40 on which the symbol 42 matching the airline company that she/he uses is displayed. In this way, the guest can use the service provided by the airline company that she/he uses.

Here, an available area, a service that can be provided, or the like may be determined based on the position of the symbol 42 on the attachment 40. For example, the position on the attachment 40 is associated with each of a plurality of available areas in the facility. When it is determined that there is the registered entity that matches the target entity 20 in the group matching the symbol 42, the authentication apparatus 2000 further determines the position of the symbol 42 on the attachment 40. Then, the authentication apparatus 2000 determines whether the target entity 20 can use the target area based on the position of the symbol 42 on the attachment 40.

Suppose that the upper left, the upper right, the lower right, and the lower left of the attachment 40 are associated with the areas A, B, C, and D, respectively. In this case, suppose that the authentication apparatus 2000 that performs authentication at the gate of the area A determines that there is a registered entity that matches the target entity 20 in the group matching the symbol 42. Further, suppose that authentication apparatus 2000 determines that symbol 42 is displayed on the upper left of attachment 40. In this case, it can be determined that the target entity 20 can use the area A based on the position of the symbol 42. Therefore, the authentication apparatus 2000 notifies the control apparatus of the gate that the target entity 20 can use the area A. As a result, the gate is opened by the control apparatus.

Here, in a case where the target entity 20 can use a plurality of areas, for example, a plurality of the same symbols 42 as each other is provided on the attachment 40. For example, in the above example, in a case where the target entity 20 can use the areas A and B, the symbol 42 matching the group to which the target entity 20 belongs is displayed on both the upper left and the upper right of the attachment 40. However, the number of symbols 42 displayed on attachments 40 may be one by associating the positions on attachments 40 with each combination of available areas.

Although the present invention has been described above with reference to the example embodiments, the present invention is not limited to the above example embodiments. Various modifications that can be understood by those skilled in the art can be made to the configuration and details of the present invention within the scope of the present invention.

Note that, in the above-described examples, the program can be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, or the like), optical magnetic storage media (for example, magneto-optical disks), CD-ROM, CD-R, CD-R/W, and semiconductor memories (such as mask ROM, PROM (Programmable ROM), EPROM (Erasable PROM), flash ROM, RAM, or the like). Further, the program may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Some or all of the above example embodiments may be described as the following supplementary notes, but are not limited to the following.

(Supplementary Note 1)

An authentication apparatus including:

an acquisition unit configured to acquire a target image including a face of a target entity; and an authentication unit configured to authenticate the target entity, wherein the authentication unit performs:

determining, for one or more registered entities, whether the registered entity matches the target entity by using face information of the registered entity and face information of the target entity; and in a case where it is determined that there is no registered entity that matches the target entity, detecting a symbol representing identification information from the target image and determining whether there is the registered entity associated with the identification information represented by the symbol, and wherein the symbol is displayed on an attachment worn on a face.

(Supplementary Note 2)

The authentication apparatus according to Supplementary Note 1, wherein the authentication unit performs:

computing, for one or more of the registered entities, an authentication score indicating a level of a probability that the target entity matches the registered entity by using the face information of the registered entity and the face information of the target entity; and in a case where there is no registered entity whose authentication score is greater than a first threshold, determining whether there is the registered entity associated with the identification information represented by the symbol among registered persons satisfying a predetermined condition based on the authentication score.

(Supplementary Note 3)

The authentication apparatus according to Supplementary Note 2, further including a face state identifying unit configured to determine whether the target entity wears the attachment by using the target image, wherein the authentication unit performs:

in a case where it is determined that the target entity does not wear the attachment, computing the authentication score by using first type face information that is face information of the registered entity in a state of not wearing the attachment, and in a case where it is determined that the target entity wears the attachment, computing the authentication score by using second type face information that is face information of the registered entity in a state of wearing the attachment.

(Supplementary Note 4)

The authentication apparatus according to Supplementary Note 3, wherein the second type face information is generated by using a face image of the registered entity in a state in which the attachment is worn, the face image being generated by superimposing an image of the attachment on a face image of the registered entity in a state in which the attachment is not worn.

(Supplementary Note 5)

The authentication apparatus according to Supplementary Note 4, wherein in a case where it is determined that the target entity wears the attachment, the authentication unit acquires a face image of the registered entity from the first type face information, and generates the second type face information by superimposing the image of the attachment on the face image.

(Supplementary Note 6)

The authentication apparatus according to any one of Supplementary Notes 2 to 5, wherein the face information of the registered entity includes an image feature value of the face of the registered entity and three-dimensional data of the face of the registered entity, wherein the acquisition unit further acquires three-dimensional data of a face of the target entity, and wherein the authentication unit computes the authentication score by using both the image feature value of the face and three-dimensional data of the face.

(Supplementary Note 7)

The authentication apparatus according to any one of Supplementary Notes 1 to 6, wherein, in a case where the symbol is not detected from the target image, a message prompting attachment of the attachment on which the symbol is displayed is output.

(Supplementary Note 8)

The authentication apparatus according to any one of Supplementary Notes 2 to 6, wherein in a case where there is a registered entity associated with the identification information represented by the symbol among registered entities that do not satisfy a predetermined condition based on the authentication score, a notification is output to the registered entity.

(Supplementary Note 9)

The authentication apparatus according to any one of Supplementary Notes 2 to 6, wherein a registered entity satisfying the predetermined condition is a registered entity having a predetermined rank or higher in descending order of the authentication score.

(Supplementary Note 10)

The authentication apparatus according to any one of Supplementary Notes 2 to 6, wherein a registered entity satisfying the predetermined condition is a registered entity whose authentication score is greater than a second threshold, and wherein the second threshold is smaller than the first threshold.

(Supplementary Note 11)

The authentication apparatus according to any one of Supplementary Notes 1 to 10, wherein the authentication unit detects the symbol from a face area of the target entity included in the target image.

(Supplementary Note 12)

The authentication apparatus according to any one of Supplementary Notes 1 to 10, wherein the authentication unit detects an area representing the attachment from the target image, and detects the symbol from the area representing the attachment.

(Supplementary Note 13)

An authentication apparatus including:

an acquisition unit configured to acquire a target image including a face of a target entity; and an authentication unit configured to authenticate the target entity, wherein the authentication unit performs:

in a case where a symbol representing identification information is detected from the target image, computing, for one or more registered entities, an authentication score indicating a level of a probability that the target entity matches the registered entity by using face information of the registered entity and face information of the target entity, and in a case where there is a registered entity whose authentication score is greater than a first threshold, determining that there is the registered entity that matches the target entity; and in a case where the symbol is detected from the target image, computing the authentication score by using face information of a registered entity and face information of the target entity associated with identification information represented by the symbol, and determining that there is the registered entity that matches the target entity in a case where the authentication score is greater than a second threshold, wherein the symbol is displayed on an attachment worn on a face, and wherein the second threshold is smaller than the first threshold.

(Supplementary Note 14)

An authentication apparatus including:

an acquisition unit configured to acquire a target image including a face of a target entity; and an authentication unit configured to authenticate the target entity, wherein the authentication unit performs:

detecting a face area of the target entity from the target image and detecting a symbol representing identification information from the face area; and in a case where there is a registered entity associated with the identification information represented by the symbol, determining that there is a registered entity that matches the target entity, and wherein the symbol is displayed on an attachment worn on a face.

(Supplementary Note 15)

An authentication apparatus including:

an acquisition unit configured to acquire a target image including a face area representing a face of a target entity; and an authentication unit configured to authenticate the target entity, wherein the authentication unit performs:

computing, for one or more registered entities belonging to a first group, an authentication score indicating a level of a probability that the target entity matches the registered entity by using face information of the registered entity and face information of the target entity, and in a case where there is a registered entity whose authentication score is greater than a first threshold, determining that there is the registered entity that matches the target entity in the first group; and in a case where there is no registered entity that matches the target entity in the first group, detecting a symbol representing identification information from the target image and determining a second group corresponding to the identification information represented by the symbol as a group to which the target entity belongs, and wherein the symbol is displayed on an attachment worn on a face.

(Supplementary Note 16)

The authentication apparatus according to Supplementary Note 15, wherein the authentication unit computes, for one or more registered entities belonging to the second group, the authentication score by using face information of the registered entity and face information of the target entity, and in a case where there is a registered entity whose authentication score is greater than a second threshold, determines that there is the registered entity that matches with the target entity in the second group.

(Supplementary Note 17)

A control method executed by a computer, the control method including:

an acquisition step of acquiring a target image including a face of a target entity; and an authentication step of authenticating the target entity, wherein in the authentication step:

for one or more registered entities, whether the registered entity matches the target entity is determined by using the face information of the registered entity and the face information of the target entity; and in a case where it is determined that there is no registered entity that matches the target entity, a symbol representing identification information is detected from the target image and whether there is the registered entity associated with the identification information represented by the symbol is determined, and wherein the symbol is displayed on an attachment worn on a face.

(Supplementary Note 18)

The control method according to Supplementary Note 17, wherein in the authentication step:

for one or more of the registered entities, an authentication score indicating a level of a probability that the target entity that matches the registered entity is computed by using the face information of the registered entity and the face information of the target entity; and in a case where there is no registered entity whose authentication score is greater than a first threshold, whether there is the registered entity associated with the identification information represented by the symbol among registered persons satisfying a predetermined condition is determined based on the authentication score.

(Supplementary Note 19)

The control method according to Supplementary Note 18, further including a face state identifying step of determining whether the target entity wears the attachment by using the target image, wherein in the authentication step:

in a case where it is determined that the target entity does not wear the attachment, the authentication score is computed by using first type face information that is face information of the registered entity in a state of not wearing the attachment; and in a case where it is determined that the target entity wears the attachment, the authentication score is computed by using second type face information that is face information of the registered entity in a state of wearing the attachment.

(Supplementary Note 20)

The control method according to Supplementary Note 19, wherein the second type face information is generated by using a face image of the registered entity in a state in which the attachment is worn, the face image being generated by superimposing an image of the attachment on a face image of the registered entity in a state in which the attachment is not worn.

(Supplementary Note 21)

The control method according to Supplementary Note 20, wherein in the authentication step, in a case where it is determined that the target entity wears the attachment, a face image of the registered entity is acquired from the first type face information, and the second type face information is generated by superimposing the image of the attachment on the face image.

(Supplementary Note 22)

The control method according to any one of Supplementary Notes 18 to 21, wherein the face information of the registered entity includes an image feature value of the face of the registered entity and three-dimensional data of the face of the registered entity, wherein in the acquisition step, three-dimensional data of a face of the target entity is further acquired, and wherein in the authentication step, the authentication score is computed by using both the image feature value of the face and three-dimensional data of the face.

(Supplementary Note 23)

The control method according to any one of Supplementary Notes 17 to 22, wherein, in a case where the symbol is not detected from the target image, a message prompting attachment of the attachment on which the symbol is displayed is output.

(Supplementary Note 24)

The control method according to any one of Supplementary Notes 18 to 22, wherein, in a case where there is a registered entity associated with the identification information represented by the symbol among registered entities that do not satisfy a predetermined condition based on the authentication score, a notification is output to the registered entity.

(Supplementary Note 25)

The control method according to any one of Supplementary Notes 18 to 22, wherein a registered entity satisfying the predetermined condition is a registered entity having a predetermined rank or higher in descending order of the authentication score.

(Supplementary Note 26)

The control method according to any one of Supplementary Notes 18 to 22, wherein a registered entity satisfying the predetermined condition is a registered entity whose authentication score is greater than a second threshold, and wherein the second threshold is smaller than the first threshold.

(Supplementary Note 27)

The control method according to any one of Supplementary Notes 17 to 26, wherein, in the authentication step, the symbol is detected from a face area of the target entity included in the target image.

(Supplementary Note 28)

The control method according to any one of Supplementary Notes 17 to 26, wherein, in the authentication step, an area representing the attachment is detected from the target image, and the symbol is detected from the area representing the attachment.

(Supplementary Note 29)

A control method executed by a computer, the control method including:

an acquisition step of acquiring a target image including a face of a target entity; and an authentication step of authenticating the target entity, wherein in the authentication step:

in a case where a symbol representing identification information is detected from the target image, for one or more registered entities, an authentication score indicating a level of a probability that the target entity matches the registered entity is computed by using face information of the registered entity and face information of the target entity, and in a case where there is a registered entity whose authentication score is greater than a first threshold, it is determined that there is the registered entity that matches the target entity; and in a case where the symbol is detected from the target image, the authentication score is computed by using face information of a registered entity and face information of the target entity associated with identification information represented by the symbol, and it is determined that there is the registered entity matches the target entity in a case where the authentication score is greater than a second threshold, wherein the symbol is displayed on an attachment worn on a face, and wherein the second threshold is smaller than the first threshold.

(Supplementary Note 30)

A control method executed by a computer, the control method including:

an acquisition step of acquiring a target image including a face of a target entity; and an authentication step of authenticating the target entity, wherein in the authentication step:

a face area of the target entity is detected from the target image and a symbol representing identification information is detected from the face area; and in a case where there is a registered entity associated with the identification information represented by the symbol, it is determined that there is a registered entity that matches the target entity, and wherein the symbol is displayed on an attachment worn on a face.

(Supplementary Note 31)

A control method executed by a computer, the control method including:

an acquisition step of acquiring a target image including a face area representing a face of a target entity; and an authentication step of authenticating the target entity, wherein in the authentication step:

for one or more registered entities belonging to a first group, an authentication score indicating a level of a probability that the target entity matches the registered entity is computed by using face information of the registered entity and face information of the target entity, and in a case where there is a registered entity whose authentication score is greater than a first threshold, it is determined that there is the registered entity that matches the target entity in the first group; and in a case where there is no registered entity that matches the target entity in the first group, a symbol representing identification information is detected from the target image, and a second group corresponding to the identification information represented by the symbol is determined as a group to which the target entity belongs, and wherein the symbol is displayed on an attachment worn on a face.

(Supplementary Note 32)

The control method according to Supplementary Note 31, wherein, in the authentication step, for one or more registered entities belonging to the second group, the authentication score is computed by using face information of the registered entity and face information of the target entity, and in a case where there is a registered entity whose authentication score is greater than a second threshold, it is determined that there is the registered entity that matches the target entity in the second group.

(Supplementary Note 33)

A computer-readable medium storing a program, wherein the program causes a computer to execute:

an acquisition step of acquiring a target image including a face of a target entity; and an authentication step of authenticating the target entity, wherein in the authentication step:

for one or more registered entities, whether the registered entity matches the target entity is determined by using the face information of the registered entity and the face information of the target entity; and in a case where it is determined that there is no registered entity that matches the target entity, a symbol representing identification information is detected from the target image and whether there is the registered entity associated with the identification information represented by the symbol is determined, and wherein the symbol is displayed on an attachment worn on a face.

(Supplementary Note 34)

The computer-readable medium according to Supplementary Note 33, wherein in the authentication step:

for one or more of the registered entities, an authentication score indicating a level of a probability that the target entity matches the registered entity is computed by using the face information of the registered entity and the face information of the target entity, and in a case where there is no registered entity whose authentication score is greater than a first threshold, whether there is the registered entity associated with the identification information represented by the symbol among registered persons satisfying a predetermined condition is determined based on the authentication score.

(Supplementary Note 35)

The computer-readable medium according to Supplementary Note 34, wherein the program causes the computer to further execute a face state identifying step of determining whether the target entity wears the attachment by using the target image, wherein in the authentication step:

in a case where it is determined that the target entity does not wear the attachment, the authentication score is computed by using first type face information that is face information of the registered entity in a state of not wearing the attachment; and in a case where it is determined that the target entity wears the attachment, the authentication score is computed by using second type face information that is face information of the registered entity in a state of wearing the attachment.

(Supplementary Note 36)

The computer-readable medium according to Supplementary Note 35, wherein the second type face information is generated by using a face image of the registered entity in a state in which the attachment is worn, the face image being generated by superimposing an image of the attachment on a face image of the registered entity in a state in which the attachment is not worn.

(Supplementary Note 37)

The computer-readable medium according to Supplementary Note 36, wherein in the authentication step, in a case where it is determined that the target entity wears the attachment, a face image of the registered entity is acquired from the first type face information, and the second type face information is generated by superimposing the image of the attachment on the face image.

(Supplementary Note 38)

The computer-readable medium according to any one of Supplementary Notes 34 to 37, wherein the face information of the registered entity includes an image feature value of the face of the registered entity and three-dimensional data of the face of the registered entity, wherein in the acquisition step, three-dimensional data of a face of the target entity is further acquired, and wherein in the authentication step, the authentication score is computed by using both the image feature value of the face and three-dimensional data of the face.

(Supplementary Note 39)

The computer-readable medium according to any one of Supplementary Notes 33 to 38, wherein, in a case where the symbol is not detected from the target image, a message prompting attachment of the attachment on which the symbol is displayed is output.

(Supplementary Note 40)

The computer-readable medium according to any one of Supplementary Notes 34 to 38, wherein, in a case where there is a registered entity associated with the identification information represented by the symbol among registered entities that do not satisfy a predetermined condition based on the authentication score, a notification is output to the registered entity.

(Supplementary Note 41)

The computer-readable medium according to any one of Supplementary Notes 34 to 38, wherein a registered entity satisfying the predetermined condition is a registered entity having a predetermined rank or higher in descending order of the authentication score.

(Supplementary Note 42)

The computer-readable medium according to any one of Supplementary Notes 34 to 38, wherein a registered entity satisfying the predetermined condition is a registered entity whose authentication score is greater than a second threshold, and wherein the second threshold is smaller than the first threshold.

(Supplementary Note 43)

The computer-readable medium according to any one of Supplementary Notes 33 to 42, wherein, in the authentication step, the symbol is detected from a face area of the target entity included in the target image.

(Supplementary Note 44)

The computer-readable medium according to any one of Supplementary Notes 33 to 42, wherein, in the authentication step, an area representing the attachment is detected from the target image, and the symbol is detected from the area representing the attachment.

(Supplementary Note 45)

A computer-readable medium storing a program, wherein the program causes a computer to execute:

an acquisition step of acquiring a target image including a face of a target entity; and an authentication step of authenticating the target entity, wherein in the authentication step:

in a case where a symbol representing identification information is detected from the target image, for one or more registered entities, an authentication score indicating a level of a probability that the target entity matches the registered entity is computed by using face information of the registered entity and face information of the target entity, and in a case where there is a registered entity whose authentication score is greater than a first threshold, it is determined that there is the registered entity that matches the target entity; and in a case where the symbol is detected from the target image, the authentication score is computed by using face information of a registered entity and face information of the target entity associated with identification information represented by the symbol, and it is determined that there is the registered entity that matches the target entity in a case where the authentication score is greater than a second threshold, wherein the symbol is displayed on an attachment worn on a face, and wherein the second threshold is smaller than the first threshold.

(Supplementary Note 46)

A computer-readable medium storing a program, wherein the program causes a computer to execute:

an acquisition step of acquiring a target image including a face of; and an authentication step of authenticating the target entity, wherein in the authentication step:

a face area of the target entity is detected from the target image and a symbol representing identification information is detected from the face area; and in a case where there is a registered entity associated with the identification information represented by the symbol, it is determined that there is a registered entity that matches the target entity, and wherein the symbol is displayed on an attachment worn on a face.

(Supplementary Note 47)

A computer-readable medium storing a program, wherein the program causes a computer to execute:

an acquisition step of acquiring a target image including a face area representing a face of a target entity; and an authentication step of authenticating the target entity, wherein in the authentication step:

for one or more registered entities belonging to a first group, an authentication score indicating a level of a probability that the target entity matches the registered entity is computed by using face information of the registered entity and face information of the target entity, and in a case where there is a registered entity whose authentication score is greater than a first threshold, it is determined that there is the registered entity that matches the target entity in the first group; and in a case where there is no registered entity that matches the target entity in the first group, a symbol representing identification information is detected from the target image, and a second group corresponding to the identification information represented by the symbol is determined as a group to which the target entity belongs, and wherein the symbol is displayed on an attachment worn on a face.

(Supplementary Note 48)

The computer-readable medium according to Supplementary Note 47, wherein, in the authentication step, for one or more registered entities belonging to the second group, the authentication score is computed by using face information of the registered entity and face information of the target entity, and in a case where there is a registered entity whose authentication score is greater than a second threshold, it is determined that there is the registered entity that matches the target entity in the second group.

REFERENCE SIGNS LIST

10 CAMERA
20 TARGET ENTITY

30 TARGET IMAGE
32 FACE AREA
40 ATTACHMENT
42 SYMBOL
50 FACE INFORMATION
60 FIRST TYPE FACE INFORMATION
70 SECOND TYPE FACE INFORMATION
500 COMPUTER
502 BUS
504 PROCESSOR
506 MEMORY
508 STORAGE DEVICE
510 INPUT/OUTPUT INTERFACE
512 NETWORK INTERFACE
2000 AUTHENTICATION APPARATUS
2020 ACQUISITION UNIT
2040 AUTHENTICATION UNIT
2060 FACE STATE IDENTIFYING UNIT

What is claimed is:

1. An authentication apparatus comprising:

at least one memory storing instructions; and at least one processor configured to execute the instructions to:

acquire a target image including a face of a target entity; and authenticate the target entity, wherein the authentication of the target entity includes:

extracting face information of the target entity from the target image;

determining, for two or more registered entities, whether the registered entity matches the target entity by using face information of the registered entity and the face information of the target entity; and only if it is determined that there is no registered entity that matches the target entity, detecting a symbol representing identification information from the target image and determining whether there is the registered entity associated with the identification information represented by the symbol, wherein the symbol is displayed on an attachment worn on a face; and wherein the symbol is not used for identifying the target entity if it is determined that there is the registered entity that matches the target entity.

2. The authentication apparatus according to claim 1, wherein the authentication of the target entity includes:

computing, for one or more of the registered entities, an authentication score indicating a level of a probability that the target entity matches the registered entity by using the face information of the registered entity and the face information of the target entity; and in a case where there is no registered entity whose authentication score is greater than a first threshold, determining whether there is the registered entity associated with the identification information represented by the symbol among registered persons satisfying a predetermined condition based on the authentication score.

3. The authentication apparatus according to claim 2, wherein the at least one processor is further configured to determine whether the target entity wears the attachment by using the target image, wherein the authentication of the target entity includes:

in a case where it is determined that the target entity does not wear the attachment, computing the authentication score by using first type face information that is face information of the registered entity in a state of not wearing the attachment; and in a case where it is determined that the target entity wears the attachment, computing the authentication score by using second type face information that is face information of the registered entity in a state of wearing the attachment.

4. The authentication apparatus according to claim 3, wherein the second type face information is generated by using a face image of the registered entity in a state in which the attachment is worn, the face image being generated by superimposing an image of the attachment on a face image of the registered entity in a state in which the attachment is not worn.

5. The authentication apparatus according to claim 4, wherein in a case where it is determined that the target entity wears the attachment, the authentication of the target entity includes acquiring a face image of the registered entity from the first type face information, and generates the second type face information by superimposing the image of the attachment on the face image.

6. The authentication apparatus according to claim 2, wherein the face information of the registered entity includes an image feature value of the face of the registered entity and three-dimensional data of the face of the registered entity, wherein the at least one processor is further configured to acquire three-dimensional data of a face of the target entity, and wherein the authentication of the target entity includes computing the authentication score by using both the image feature value of the face and three-dimensional data of the face.

7. The authentication apparatus according to claim 1, wherein the at least one processor is further configured to, in a case where the symbol is not detected from the target image, output a message prompting attachment of the attachment on which the symbol is displayed.

8. The authentication apparatus according to claim 2, wherein the at least one processor is further configured to, in a case where there is a registered entity associated with the identification information represented by the symbol among registered entities that do not satisfy a predetermined condition based on the authentication score, output a notification to the registered entity.

9. The authentication apparatus according to claim 2, wherein a registered entity satisfying the predetermined condition is a registered entity having a predetermined rank or higher in descending order of the authentication score.

10. The authentication apparatus according to claim 2, wherein a registered entity satisfying the predetermined condition is a registered entity whose authentication score is greater than a second threshold, and wherein the second threshold is smaller than the first threshold.

11. The authentication apparatus according to claim 1, wherein the authentication of the target entity includes detecting the symbol from a face area of the target entity included in the target image.

12. The authentication apparatus according to claim 1, wherein the authentication of the target entity includes detecting an area representing the attachment from the target image, and detecting the symbol from the area representing the attachment.

13. A control method executed by a computer, the control method comprising:

acquiring a target image including a face of a target entity; and authenticating the target entity, wherein the authentication of the target entity includes:

extracting face information of the target entity from the target image;

determining, for two or more registered entities, whether the registered entity matches the target entity by using face information of the registered entity and the face information of the target entity;

only if it is determined that there is no registered entity that matches the target entity, detecting a symbol representing identification information from the target image and determining whether there is the registered entity associated with the identification information represented by the symbol, wherein the symbol is displayed on an attachment worn on a face, and wherein the symbol is not used for identifying the target entity if it is determined that there is the registered entity that matches the target entity.

14. A non-transitory computer-readable medium storing a program that causes a computer to execute:

acquiring a target image including a face of a target entity; and authenticating the target entity, wherein the authentication of the target entity includes:

extracting face information of the target entity from the target image;

determining, for two or more registered entities, whether the registered entity matches the target entity by using the face information of the registered entity and the face information of the target entity; and only if it is determined that there is no registered entity that matches the target entity, detecting a symbol representing identification information from the target image and determining whether there is the registered entity associated with the identification information represented by the symbol, wherein the symbol is displayed on an attachment worn on a face, and wherein the symbol is not used for identifying the target entity if it is determined that there is the registered entity that matches the target entity.

\* \* \* \* \*